US009374757B2

(12) United States Patent
Lee et al.

(10) Patent No.: US 9,374,757 B2
(45) Date of Patent: Jun. 21, 2016

(54) METHOD AND APPARATUS FOR ONE CELL OPERATION WITH FAST SMALL CELL SWITCHING IN WIRELESS COMMUNICATION SYSTEM

(71) Applicant: Samsung Electronics Co., Ltd., Suwon-si, Gyeonggi-do (KR)

(72) Inventors: Heekwang Lee, Suwon-si (KR); Eunseok Ko, Yongin-si (KR); June Moon, Gwacheon-si (KR); Seungjoo Maeng, Seongnam-si (KR); Jungah Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 129 days.

(21) Appl. No.: 14/142,282

(22) Filed: Dec. 27, 2013

(65) Prior Publication Data

US 2014/0185480 A1 Jul. 3, 2014

(30) Foreign Application Priority Data

Dec. 27, 2012 (KR) .......................... 10-2012-0154678
Mar. 19, 2013 (KR) .......................... 10-2013-0029424

(51) Int. Cl.
*H04L 12/26* (2006.01)
*H04W 36/30* (2009.01)
*H04W 36/04* (2009.01)

(52) U.S. Cl.
CPC .............. *H04W 36/30* (2013.01); *H04W 36/04* (2013.01)

(58) Field of Classification Search
CPC ........................................................ H04B 1/7103
USPC ............................................................ 370/252
See application file for complete search history.

(56) References Cited

U.S. PATENT DOCUMENTS

| 2010/0128622 | A1* | 5/2010 | Horiuchi et al. | ............... 370/252 |
| 2011/0267992 | A1* | 11/2011 | Seo et al. | ............... 370/279 |
| 2012/0120842 | A1 | 5/2012 | Kim et al. | |
| 2012/0182896 | A1 | 7/2012 | Jang et al. | |
| 2012/0218968 | A1 | 8/2012 | Kim et al. | |
| 2013/0287064 | A1* | 10/2013 | Seo et al. | ............... 375/144 |

FOREIGN PATENT DOCUMENTS

| KR | 10-2011-0011524 A | 2/2011 |
| KR | 10-2012-0093027 A | 8/2012 |
| KR | 10-2012-0095813 A | 8/2012 |
| KR | 10-2012-0112368 A | 10/2012 |

* cited by examiner

*Primary Examiner* — Wei Zhao
(74) *Attorney, Agent, or Firm* — Jefferson IP Law, LLP

(57) ABSTRACT

A method of supporting fast sub-cell switching by a sub-cell included in a macro coverage in a wireless communication system is provided. The method includes receiving multiple pieces of feedback information on multiple sub-cells from a User Equipment (UE), extracting channel quality indicators from the multiple pieces of received feedback information, respectively, comparing values of the extracted channel quality indicators, and determining, based on a result of the comparison of the values of the extracted channel quality indicators, whether to perform fast sub-cell switching of the UE.

26 Claims, 24 Drawing Sheets

METHOD AND APPARATUS FOR ONE CELL OPERATION WITH FAST SMALL CELL SWITCHING IN WIRELESS COMMUNICATION SYSTEM

CROSS-REFERENCE TO RELATED APPLICATION(S)

This application claims the benefit under 35 U.S.C. §119 (a) of a Korean patent application filed on Dec. 27, 2012 in the Korean Intellectual Property Office and assigned Serial number 10-2012-0154678 and a Korean patent application filed on Mar. 19, 2013 in the Korean Intellectual Property Office and assigned Serial number 10-2013-0029424, the entire disclosure of each of which is hereby incorporated by reference.

TECHNICAL FIELD

The present disclosure relates to a wireless communication system. More particularly, the present disclosure relates to a method and an apparatus for fast sub-cell switching in a wireless communication system performing a cooperative communication.

BACKGROUND

In general, mobile communication systems have been developed to provide a voice communication service while securing the mobility of users. However, the scope of services provided by the mobile communication systems have extended beyond the voice communication providing service and have now developed up to a level at which the mobile communication systems can provide a high speed data service. In spite of such a development, current mobile communication systems undergo deficiency of resources and users of current mobile communication systems require a service of a higher speed. Therefore, there is a requirement for a further developed mobile communication system.

In order to meet such a requirement, the 3rd Generation Partnership Project (3GPP) is arranging standards for the Long Term Evolution (LTE) system which is being developed as one of next generation mobile communication systems. The LTE is a technology for achieving a high speed packet-based communication having a transmission speed of about 100 Mbps. To this end, various schemes are being discussed, including a scheme of simplifying a structure of a network to reduce the number of nodes located in a communication path and a scheme of making wireless protocols as close to a wireless channel as possible.

Meanwhile, efficient use of a radio spectrum is required in order to improve the performance of a wireless communication. However, the inter-cell interference in a dense network environment is a main cause limiting the performance improvement. A promising technology being studied in order to solve such an inter-cell interference problem is an inter-multi-cell cooperative transmission technology.

Recently, a cooperative communication technology, specifically a Coordinated Multi-Point transmission and reception (CoMP) technology, is being studied as a technology for improving the cell edge performance and the coverage. A study on a CoMP in a Heterogeneous Network (HetNet) is of particular interest, and a study for supporting fast sub-cell switching in the CoMP technology is being progressed.

Further, various studies are recently in progress for mobility enhancement as well as interference coordination in a dense small cell deployment environment, such as, for example, in a small cell environment (e.g., subway station, shopping mall, sports ground, stadium, city square, city street, downtown area, and the like) denser than the conventional small cell environment within a macro coverage.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for fast sub-cell switching in a wireless communication system.

Another aspect of the present disclosure is to provide a method of transmitting a demodulation reference signal for demodulation by a User Equipment (UE) and a channel state information reference signal for channel measurement by a UE while discriminating between one or more sub-cells, which are located within a macro coverage and use the same physical cell identifier as that of a macro evolved Node B (eNB), and a method of fast sub-cell switching using multiple pieces of feedback information transmitted from the UE.

Technical Solution

In accordance with an aspect of the present disclosure, a method of supporting fast sub-cell switching by a sub-cell included in a macro coverage in a wireless communication system is provided. The method includes receiving first feedback information on a serving sub-cell of a UE and second feedback information on a neighbor sub-cell of the UE, extracting a first channel quality indicator from the first feedback information and a second channel quality indicator from the second feedback information, respectively, comparing values of the first channel quality indicator and the second channel quality indicator, and determining, based on a result of the comparison of the values of the extracted channel quality indicators, whether to perform fast sub-cell switching of the UE, wherein the sub-cell uses a physical cell identifier identical to that of the other sub-cells included in the macro coverage.

In accordance with another aspect of the present disclosure, a method of reporting channel state information by a UE in a wireless communication system is provided. The method includes receiving configuration information for channel state information reference signal measurement from a sub-cell, measuring a channel state of a serving sub-cell and generating first feedback information at a first timing for channel state information reference signal transmission, measuring a channel state of a neighbor sub-cell and generating second feedback information at a second timing for channel state information reference signal transmission, and reporting the generated first feedback information and second feedback information to the serving sub-cell.

In accordance with another aspect of the present disclosure, a sub-cell supporting fast sub-cell switching in a wireless communication system is provided. The sub-cell includes a wired/wireless interface configured to perform a wired/wireless communication with at least one of a UE and a higher node, and a controller configured to receive first feedback information on a serving sub-cell of a UE and second feedback information on a neighbor sub-cell of the UE, to extract a first channel quality indicator from the first feedback information and a second channel quality indicator from the second feedback information, respectively, to compare values of the first channel quality indicator and the second channel quality indicator, and to determine, based on a result of the comparison of the values of the extracted channel quality indicators, whether to perform fast sub-cell switching of the UE.

In accordance with another aspect of the present disclosure, a UE reporting channel state information in a wireless communication system is provided. The UE includes a wireless communication unit configured to perform a wireless communication with a sub-cell, and a controller is configured to receive configuration information for channel state information reference signal measurement from a sub-cell, to measure a channel state of a serving sub-cell and generate first feedback information at a first timing for channel state information reference signal transmission, to measure a channel state of a neighbor sub-cell and generate second feedback information at a second timing for channel state information reference signal transmission, and to report the generated first feedback information and second feedback information to the serving sub-cell.

In accordance with another aspect of the present disclosure, a method of supporting fast sub-cell switching by a sub-cell included in a macro coverage in a wireless communication system is provided. The method includes receiving multiple pieces of feedback information on multiple sub-cells from a UE, extracting channel quality indicators from the multiple pieces of received feedback information, respectively, comparing values of the extracted channel quality indicators, and determining, based on a result of the comparison of the values of the extracted channel quality indicators, whether to perform fast sub-cell switching of the UE.

According to an aspect of the present disclosure, each of the sub-cells included the macro coverage may be discriminated from each other based on a Physical Cell IDentifier (PCID) and Virtual Cell Identifiers (VCIDs), each of which is specific to a sub-cell.

According to another aspect of the present disclosure, a sub-cell may generate a demodulation reference signal to which a VCID specific to the sub-cell has been applied, map the generated demodulation reference signal to a predetermined resource, and transmit the mapped demodulation reference signal to the UE.

According to another aspect of the present disclosure, a sub-cell according to may determine a Coordinated Multi-Point transmission and reception (CoMP) measurement set including a serving sub-cell and a neighbor sub-set of the UE, transmit configuration information on channel measurement information reference signal resources for channel measurement of sub-cells included in the CoMP measurement set to the UE, generate a channel state information reference signal to which a virtual cell identifier specific to the sub-cell has been applied, and transmit the generated channel state information reference signal to the UE based on the configuration information.

According to another aspect of the present disclosure, a sub-cell may transmit configuration information on zero power channel measurement information reference signal resources for the sub-cells included in the CoMP measurement set to the UE, map a zero power channel measurement information reference signal to a data region of a resource transmitted to the UE according to the configuration information, and transmit the mapped zero power channel measurement information reference signal to the UE. In this event, the UE measures interference through the zero power channel measurement information reference signal.

Advantageous Effects

According to the present disclosure, fast sub-cell switching between sub-cells can be achieved without interference between reference signals even in a wireless communication system in which one or more cells located within a macro coverage use the same physical cell identifier as the physical cell identifier of a macro eNB. Therefore, the present disclosure can maximize the cell edge performance and the transmission efficiency and can minimize the frequency of occurrence of handover, so as to guarantee the seamless mobility of a UE.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
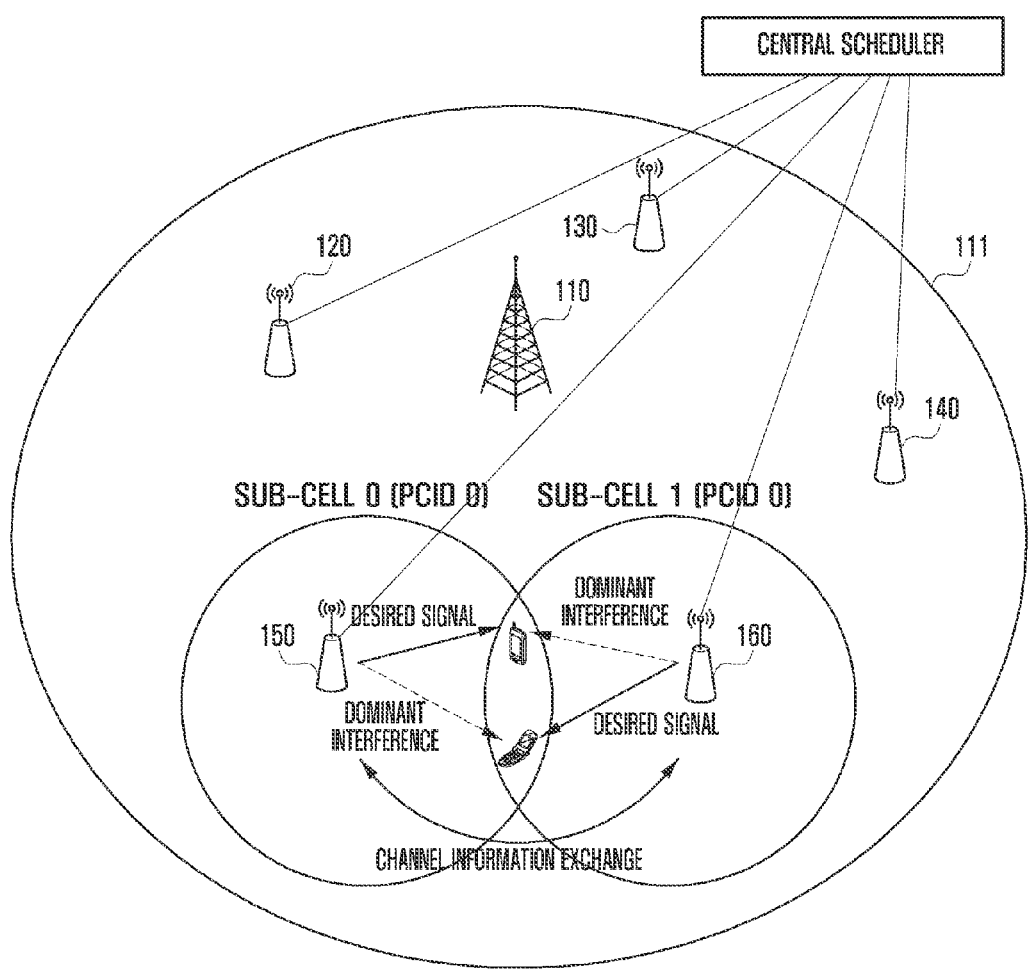
FIGS. 1A and 1B illustrate a structure of a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Further, in the detailed description of various embodiments of the present disclosure, an Advanced Evolved Universal Terrestrial Radio Access (E-UTRA) (or referred to also as Long Term Evolution Advanced (LTE-A)) system supporting a cooperative communication Coordinated Multi-Point transmission and reception (CoMP) is mainly discussed. However, various embodiments of the present disclosure is applicable to other communication systems having similar technical backgrounds or channel types through a small modification without departing from the scope of the present disclosure, which can be made by one skilled in the art.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk ("DVD") player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography ("CT") device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a User Equipment (UE) may be an electronic device.

Figure 1B:
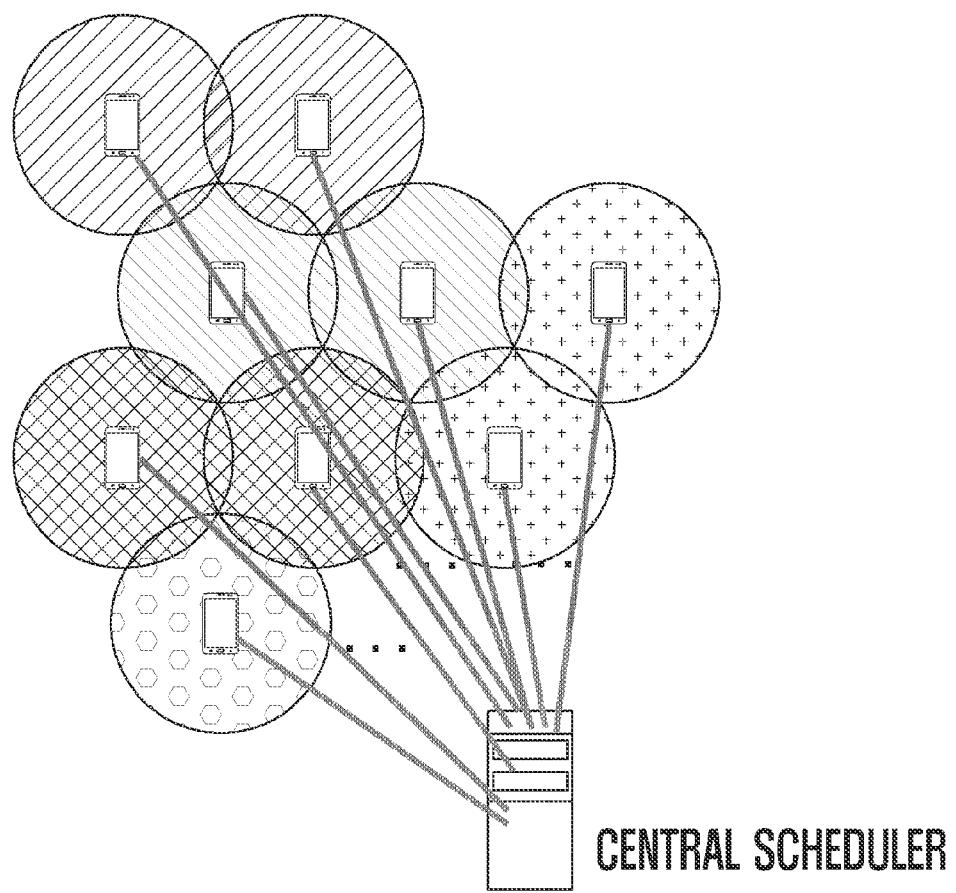

FIGS. 1A and 1B illustrate a structure of a wireless communication system according to an embodiment of the present disclosure. Specifically, FIGS. 1A and 1B illustrate a fast small cell switching situation based on 2 Channel State Information (CSI) feedbacks.

Referring to FIGS. 1A and 1B, one macro coverage 111 configuring a wireless communication system according to various embodiments of the present disclosure can be defined as a service area in which a macro evolved Node B (eNB) 110 can provide a service.

The macro eNB 110 is connected to a UE through a wireless channel and controls radio resources. For example, the macro eNB 110 may generate and broadcast necessary control information within the macro cell as system information, or may allocate a radio resource in order to transmit or receive data or control information to or from a UE. Moreover, the macro eNB 110 may collect information of channel measurement results of a current cell and neighbor cells from a UE, and determine and command a handover. To this end, the macro eNB 110 has control protocols, such as a Radio Resource Protocol (RRC) relating to radio resource control.

Meanwhile, one or more sub-cells 120, 130, 140, 150, and 160 may be included in the macro coverage 111. The small cell may include a Remote Radio Head (RRH) or a Transmission Point (TP). The technology of various embodiments of the present disclosure is based on a premise that a sub-cell, an RRH, a TP, and a small cell may be used mixedly with each other.

Further, as illustrated in FIG. 1B, individual cells may share respective channel information thereof with each other through a central scheduler node or an X2 interface. According to various embodiments of the present disclosure, the macro eNB 110 may transmit an identical Physical Cell IDentifier (PCID) to UEs belonging to two neighbor sub-cells (RRHs, TPs, small cells, and/or the like) within the macro coverage 111.

Various embodiments of the present disclosure described below are based on a premise that sub-cell 0 150 and sub-cell 1 160 included in the macro coverage 111 transmit an identical PCID #0. Use of an identical PCID between sub-cells may remove the Cell-specific Reference Signal (CRS) interference.

Meanwhile, sub-cell 0 150 and sub-cell 1 160, which are adjacent to each other, transmit data to UEs to which they provide the service, respectively. In this event, sub-cell 0 150 generates a dominant interference to a UE to which sub-cell 1 160 provides the service, and sub-cell 1 160 generates a dominant interference to a UE to which sub-cell 0 150 provides the service.

Further, sub-cells hatched by inclined lines of the same pattern may be considered as one cell having the same PCID, which implies that a handover requiring RRC reset of a higher layer does not occur between those sub-cells.

Figure 2:
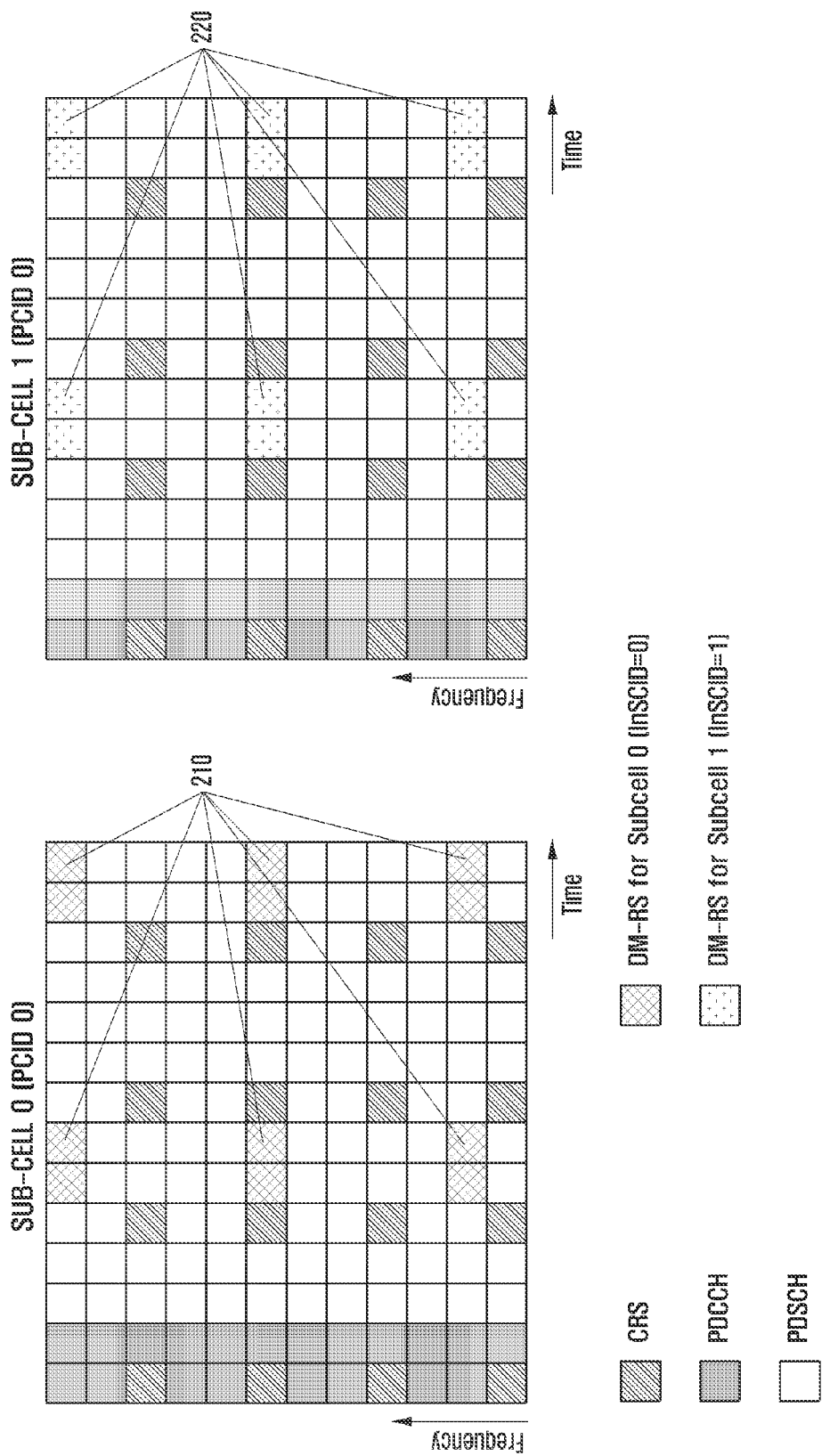
FIG. 2 is a diagram for illustrating a method in which two sub-cells transmitting a same Physical Cell IDentifier (PCID) configure set demodulation reference signals for channel measurement in order to support independent demodulation for User Equipments (UEs) to which the sub-cells respectively provide a service according to an embodiment of the present disclosure.

FIG. 2 is a diagram for illustrating a method in which two sub-cells transmitting a same PCID configure set demodulation reference signals for channel measurement in order to support independent demodulation for UEs to which the sub-cells respectively provide a service according to an embodiment of the present disclosure.

Referring to FIG. 2, various embodiments of the present disclosure are based on an assumption that a basic unit of radio resources transmitted from sub-cell 0 150 and sub-cell 1 160 to UEs is a sub-frame configured by time and frequency wherein the sub-frame is configured by 12 sub-carriers along the frequency axis and 14 symbols along the time axis. Each of the sub-cells transmits control information and data to a UE through the sub-frame.

Meanwhile, a plurality of different types of signals as described below may be transmitted through the radio resources shown in FIG. 2.

1. Cell-specific Reference Signal (CRS): a reference signal which is periodically transmitted to all UEs belonging to one cell and may be commonly used by a plurality of UEs.

2. DeModulation Reference Signal (DMRS): a reference signal transmitted to a particular UE. The DMRS is transmitted only when data is transmitted to the particular UE. The DMRS may be configured by a total of 8 DMRS ports. In Long Term Evolution (LTE)/LTE-A, ports from port 7 to port 14 correspond to DMRS ports, and the DMRS ports maintain the orthogonality in order to prevent generation of interference between the DMRS ports by using CDM or FDM.

3. Physical Downlink Shared CHannel (PDSCH): a data channel which is transmitted in the downlink, is used by an eNB to transmit traffic to a UE, and is transmitted using a Resource Element (RE) not used for transmission of a reference signal in a data region.

4. Channel Status Information-Reference Signal (CSI-RS): a reference signal which is transmitted to UEs belonging to one cell and is used for measurement of the channel state. One CSI-RS or a plurality of CSI-RSs may be transmitted in one cell.

5. Other control channels (e.g., Physical Hybrid-Automatic Repeat Request (ARQ) Indicator Channel (PHICH), Physical Control Format Indicator Channel (PCFICH), Physical Downlink Control Channel (PDCCH), and/or the like): control channels for provision of control information necessary for reception of a PDSCH by a UE or for transmission of an ACK/NACK for operation of HARQ with respect to uplink data transmission.

Referring to FIG. 2, a method of transmitting a DMRS, among the signals transmitted by a sub-cell, is now described. When neighbor sub-cells use the same PCID, an interference is not recognized as an interference without a sub-cell-specific identification of a DMRS.

In order to prevent occurrence of such a problem, various embodiments of the present disclosure propose a scheme in which sub-cell 0 150 and sub-cell 1 160 having the same PCID apply different scrambling IDs (nSCIDs) to DMRS scrambling sequences of the sub-cell 0 150 and the sub-cell 1 160 so that UEs to which sub-cell 0 150 and sub-cell 1 160 respectively provide a service may perform independent demodulation. For example, according to various embodiments of the present disclosure, a scrambling ID is used to identify each of sub-cells having the same PCID. In other words, different n Service Channel Identifiers (nSCIDs) (e.g., scrambling identifiers; scrambling IDs) of 0 and 1 are applied to two sub-cells having the same PCID, so as to achieve an interference randomization.

For example, sub-cell 0 150 applies scrambling code 0 (nSCID=0) to a DMRS 210 for a UE served by sub-cell 0 150 itself and then transmits the DMRS 210 to the UE, and sub-cell 1 160 applies scrambling code 1 (nSCID=1) to a DMRS 220 for a UE served by sub-cell 1 160 itself and then transmits the DMRS 220 to the UE.

Therefore, even when neighbor sub-cells have the same PCID, neighbor sub-cells are able to exactly reflect interference thereof to each other in the estimation of a data channel (e.g., Physical Downlink Shared Channel (PDSCH)) of a UE by applying different scrambling codes to the scrambling sequences for the DMRSs. Further, antenna ports 7 to 14 may be used to enable each sub-cell to support multi-layers of rank 2 or higher.

Figure 3:
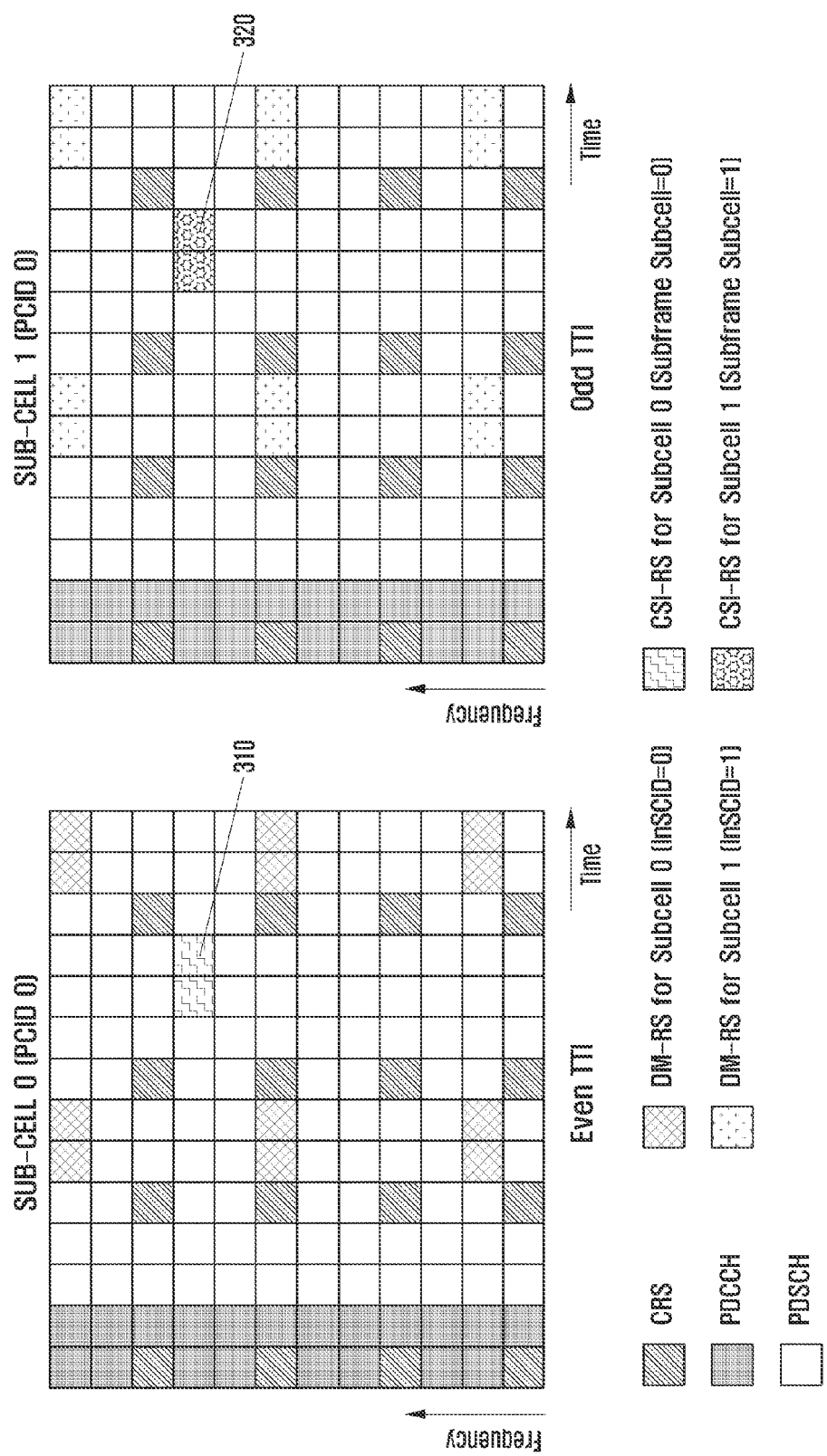
FIG. 3 is a diagram illustrating a method in which neighbor sub-cells having a same PCID allocate resources for Channel State Information-Reference Signal (CSI-RS) transmission in order to support exact channel measurement of each UE according to an embodiment of the present disclosure.

FIG. 3 is a diagram illustrating a method in which neighbor sub-cells having a same PCID allocate resources for CSI-RS transmission in order to support exact channel measurement of each UE according to an embodiment of the present disclosure.

Referring to FIG. 3, a method of transmitting a SCI-RS, which is used for measurement of a channel state among the signals transmitted by a sub-cell, is now described.

As noted from FIG. 3, sub-cell 0 150 and sub-cell 1 160 having the same PCID allocate resources for CSI-RSs to be used for channel measurement to the same resource element position. More specifically, an RE resource 310 allocated for SCI-RS transmission by sub-cell 0 150 and an RE resource 320 allocated for SCI-RS transmission by sub-cell 1 160 are located at the same position in the sub-frame. The CSI-RS may be referred to also as Non Zero Power (NZP) SCI-RS. As a result, each UE may exactly measure the channel state.

A process in which a UE receives the CSI-RS to measure a channel state and then feeds back the measured channel state will be described later.

Figure 4:
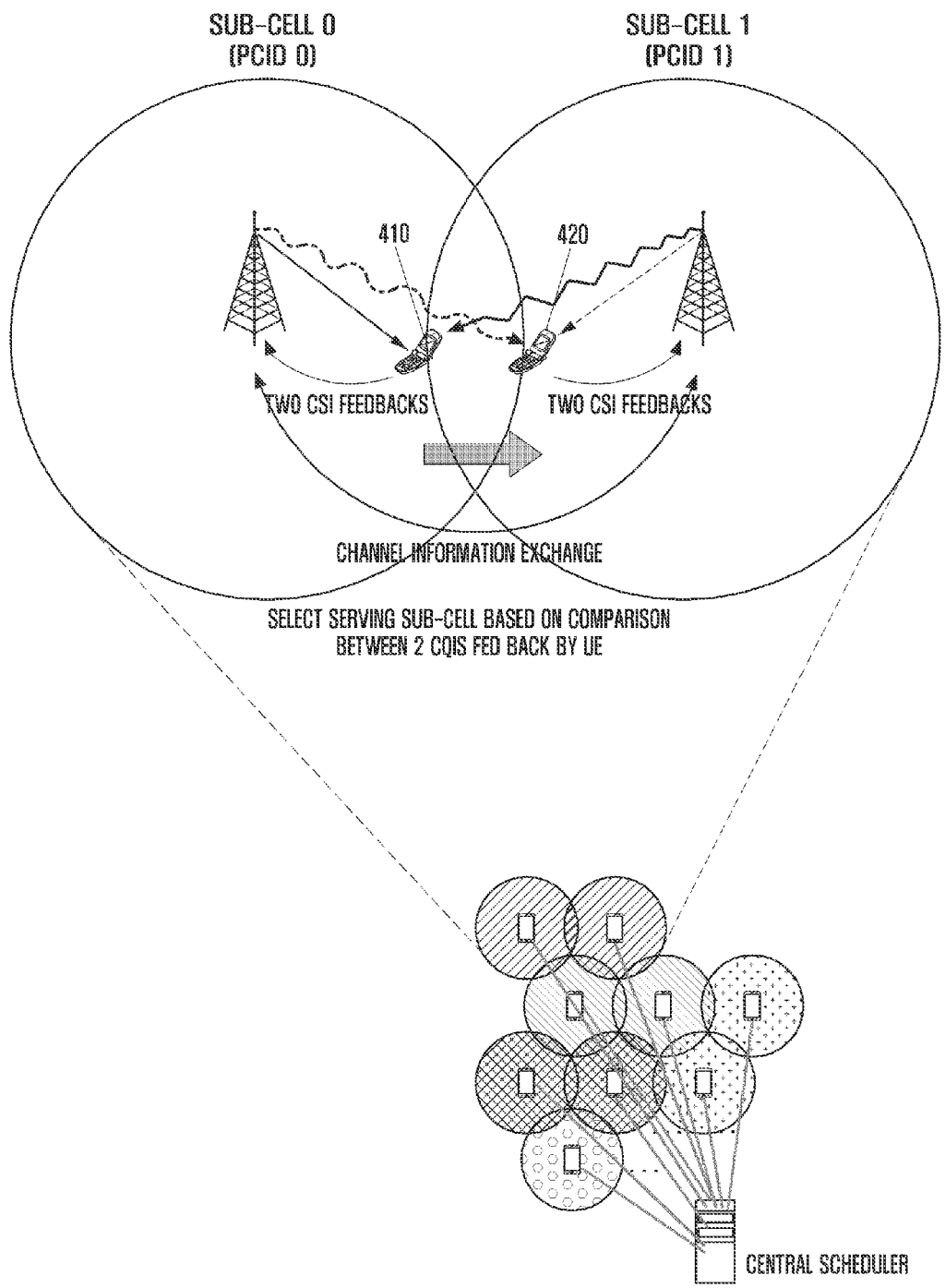
FIG. 4 is a diagram illustrating sub-set configuration for feeding back multiple pieces of channel state information on two sub-cells having a same PCID according to an embodiment of the present disclosure.

FIG. 4 is a diagram illustrating sub-set configuration for feeding back multiple pieces of channel state information on two sub-cells having a same PCID according to an embodiment of the present disclosure. For example, FIG. 4 is a diagram illustrating fast sub-cell switching between two sub-cells having the same PCID according to an embodiment of the present disclosure.

Referring to FIG. 4, according to various embodiments of the present disclosure, UEs 410 and 420 receive CSI-RSs transmitted from sub-cell 0 150 and sub-cell 1 160 to measure channel states, generate feedback information for the received CSI-RSs, and respectively report the feedback information to serving cells thereof.

More specifically, the UE 410 measures a channel state at a first timing and generates first feedback information reflecting the measured channel state, and measures a channel state at a second timing and generates second feedback information reflecting the measured channel state. The feedback information may also be referred to as Channel Status Information (CSI) and may include a Channel Quality Indicator (CQI), a Precoding Matrix Index (PMI), a Rank Indicator (RI), and/or the like.

According to various embodiments of the present disclosure, the first timing may be set for measurement of the channel state of a serving cell and the second timing may be set for measurement of the channel state of a neighbor sub-cell (e.g., a dominant interference sub-cell).

According to various embodiments of the present disclosure, the UE 410 reports the first and second feedback information to the serving sub-cell thereof at a predetermined timing.

In the same way, the UE 420 also generates feedback information at the first timing and the second timing and then reports the feedback information to the serving sub-cell thereof.

Through this process, sub-cell 0 150 and sub-cell 1 160 illustrated in FIG. 4 receive two types of feedback information, which includes first feedback information for the serving sub-cell and second feedback information for the interference sub-cell, from one UE.

Then, the sub-cell determines, by using the two types of feedback information, whether to perform fast sub-cell switching of the UE. According to various embodiments of the present disclosure, the sub-cell may determine whether to perform the fast sub-cell switching, by comparing CQI value in the feedback information.

According to various embodiments of the present disclosure as described above, the channel state information fed back by a UE is used as a basis for determining whether to perform fast cell switching between sub-cells. Therefore, Radio Resource Control (RRC) reconfiguration of a higher layer is unnecessary and a fast cell switching between sub-cells may be thus achieved.

According to various embodiments of the present disclosure, whether to perform a sub-cell switching of a UE may be determined by a sub-cell itself through sharing of channel state information between sub-cells based on an X2 interface between eNB nodes, or may be determined by a central scheduler node connected to the sub-cells. It should be noted that the present disclosure is not limited to one embodiment of the present disclosure.

Figure 5:
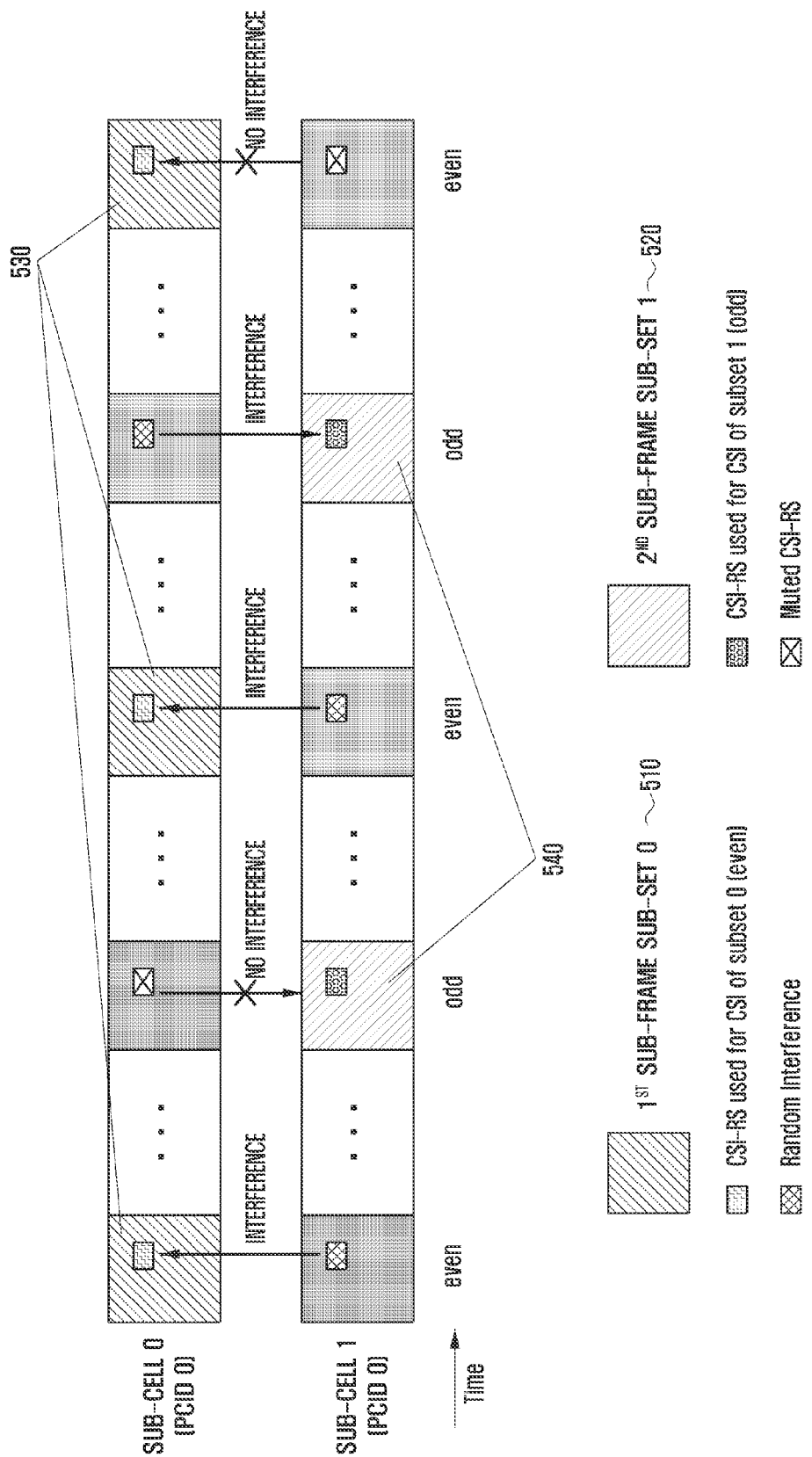
FIG. 5 is a diagram illustrating a sub-frame sub-set configuration for feeding back multiple pieces of channel state information on two sub-cells having a same PCID by a UE according to an embodiment of the present disclosure.

FIG. 5 is a diagram illustrating a sub-frame sub-set configuration for feeding back multiple pieces of channel state information on two sub-cells having a same PCID by a UE according to an embodiment of the present disclosure.

Referring to FIG. 5, according to various embodiments of the present disclosure, in order to perform fast sub-cell switching, feedback information of a UE on each of a serving sub-cell and an interference sub-cell is necessary. The feedback information may also be referred to as Channel Status Information (CSI) and may include a Channel Quality Indicator (CQI), a Precoding Matrix Index (PMI), a Rank Indicator (RI), and the like.

For measurement and report of feedback information on each of a serving cell and an interference cell by a UE, various embodiments of the present disclosure define a first sub-frame subset 0 510, a second sub-frame subset 1 520, a first timing 530, and a second timing 540.

The first sub-frame subset 0 510 corresponds to a sub-frame for measurement of a channel of sub-cell 0 150 and the second sub-frame subset 1 520 corresponds to a sub-frame for measurement of a channel of sub-cell 1 160. The first timing 530 and the second timing 540 are respectively defined in the first sub-frame subset 0 510 and the second sub-frame subset 1 520.

The UE measures a channel of sub-cell 0 150 or sub-cell 1 160 at the first timing 530. Specifically, the UE measures a channel state of sub-cell 0 150 at the first timing 530. Further, the UE measures a channel of sub-cell 1 160 or sub-cell 0 150 at the second timing 540. Specifically, the UE measures a channel state of sub-cell 1 160 at the second timing 540.

According to various embodiments of the present disclosure, the first timing 530 and the second timing 540 may be respectively allocated in a pattern with a cycle of 10 ms, and the first timing 530 (at even turns) and the second timing 540 (at odd turns) may be alternately set at every 5 ms. More specifically, based on an assumption that 10 sub-frames configure one radio frame and one sub-frame has a temporal length of 1 ms, the 0th sub-frame of one radio frame may be set as the first timing and the 5th-frame of the radio frame may be set as the second timing.

Further, sub-cell 0 150 and sub-cell 1 160 may adaptively apply NZP CSI-RS allocation, random noise occurrence, and Muted CSI-RS allocation to an RE position to which the CSI-RS is to be allocated, so as to enable each UE to exactly measure the channel state.

Specifically, at the first timing 530, sub-cell 0 150 allocates an NZP CSI-RS for channel measurement of sub-cell 0 150 to a predetermined RE position of the first sub-frame subset 0 510, and sub-cell 1 160 applies a random noise to an RE position corresponding to the position to which the NZP CSI-RS of sub-cell 0 150 has been allocated, so as to enable an interference of sub-cell 1 160 to be reflected in the measurement of the channel of sub-cell 0 150 by the UE. If sub-cell 1 160 is blank at the corresponding Transmission Time Interval (TTI), sub-cell 1 160 sets Muted CSI-RS at the RE position corresponding to the position to which the NZP CSI-RS of sub-cell 0 150 has been allocated, so as to prevent an interference of sub-cell 1 160 from being reflected in the measurement of the channel of sub-cell 0 150 by the UE. The Muted CSI-RS may be mixedly used with Zero Power Transmission (ZPT) CSI-RS and refers to a CSI-RS having a transmission power of 0.

Further, at the second timing 540, sub-cell 160 allocates an NZP CSI-RS for channel measurement of sub-cell 1 160 to a predetermined RE position of the second sub-frame subset 1 520, and sub-cell 0 150 applies a random noise to an RE position corresponding to the position to which the NZP CSI-RS of sub-cell 1 160 has been allocated, so that an interference of sub-cell 0 150 may be reflected in the measurement of the channel of sub-cell 1 160 by the UE. If sub-cell 0 150 is blank at a corresponding TTI, sub-cell 0 150 sets Muted CSI-RS at the RE position corresponding to the position to which the NZP CSI-RS of sub-cell 1 160 has been allocated, so as to prevent an interference of sub-cell 0 150 from being reflected in the measurement of the channel of sub-cell 1 160 by the UE.

Figure 6:
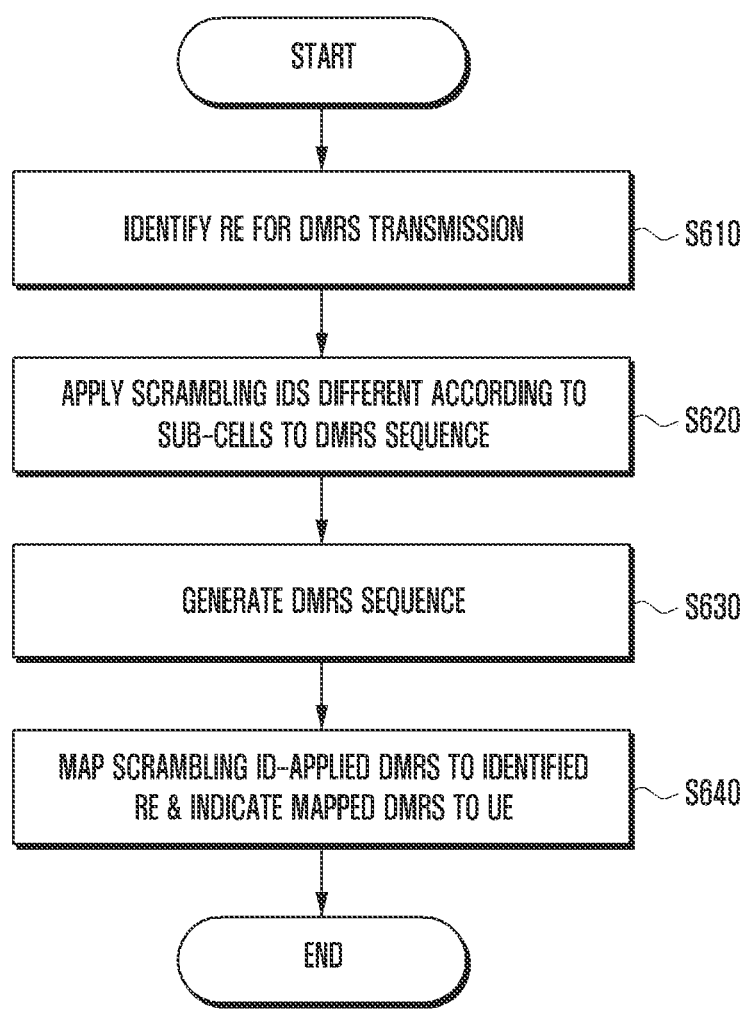
FIG. 6 is a flowchart illustrating a process of transmitting (or configuring) a DeModulation Reference Signal (DMRS) by a sub-cell according to an embodiment of the present disclosure.

FIG. 6 is a flowchart illustrating a process of transmitting (or configuring) a DMRS by a sub-cell according to an embodiment of the present disclosure.

At operation S610, the sub-cell identifies an RE position within the sub-frame for transmitting the DMRS.

At operation S620, the sub-cell applies scrambling IDs, which are different according to sub-cells, to a DMRS scrambling sequence. For example, when the sub-cell is sub-cell 0, a scrambling ID 0 (nSCID=0) may be applied.

At operation S630, the sub-cell generates a scrambling sequence for the DMRS.

At operation S640, the sub-cell maps the DMRS, to which the scrambling code has been applied, to the identified resource and transmits the DMRS to the UE.

Figure 7A:
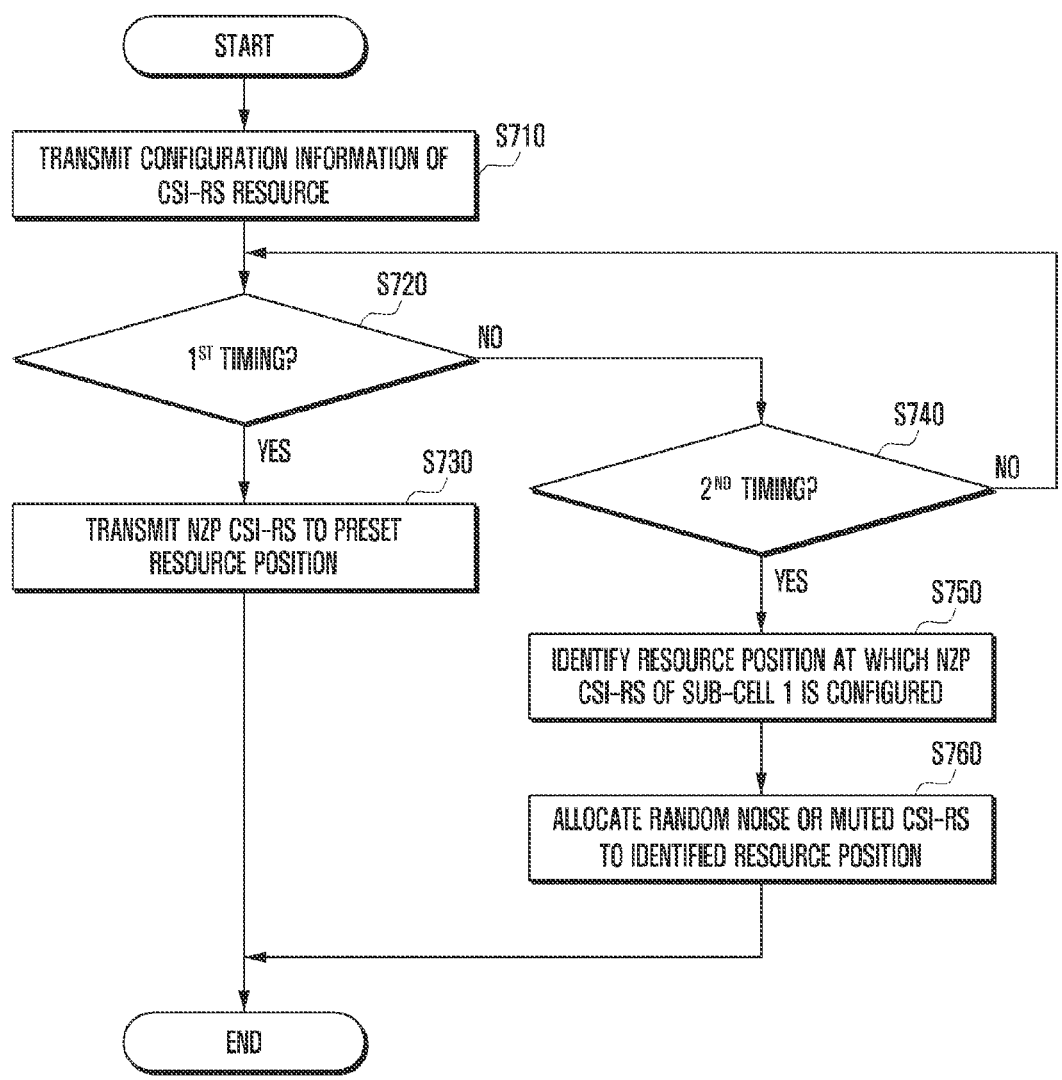
FIGS. 7A and 7B are flowcharts respectively illustrating processes of transmitting a CSI-RS by sub-cell 0 and sub-cell 1 according to an embodiment of the present disclosure.
Figure 7B:
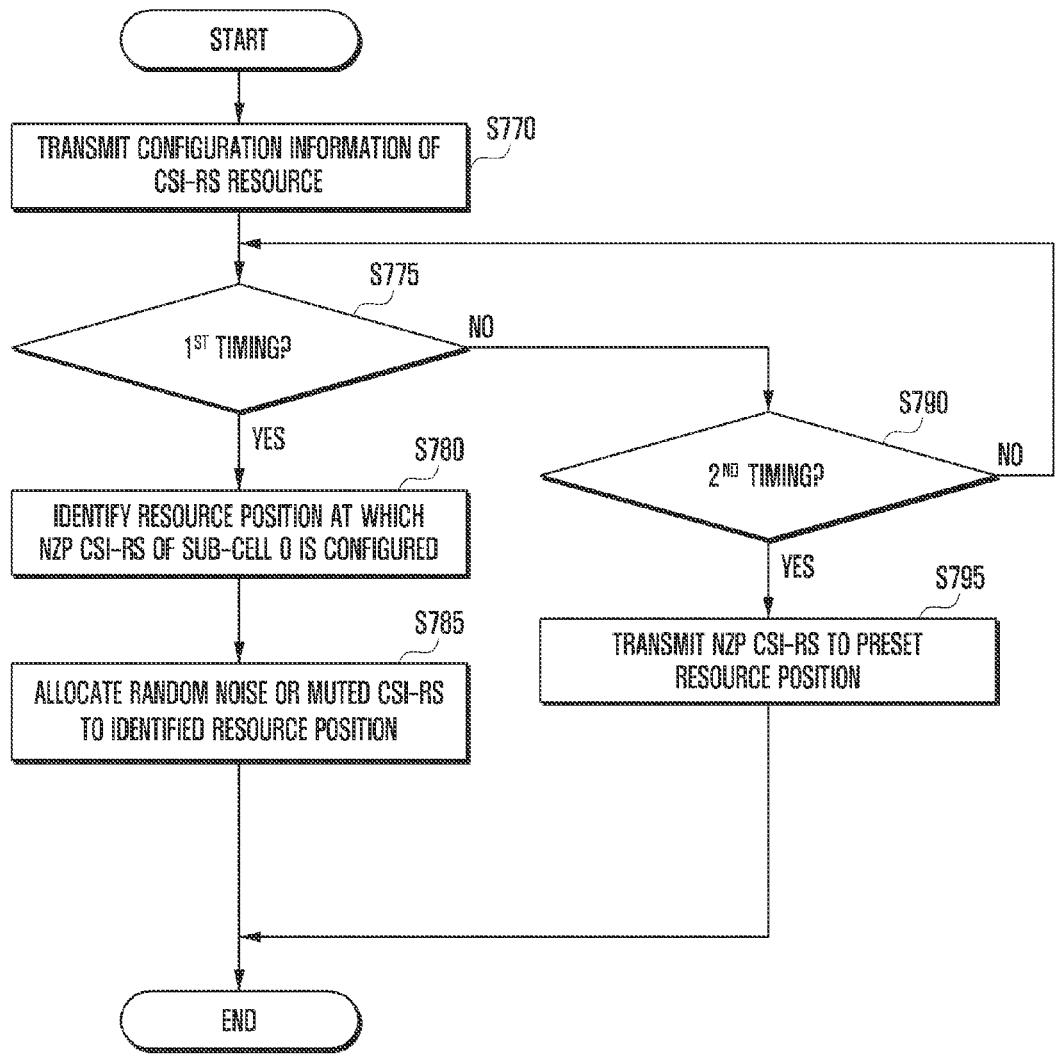

FIGS. 7A and 7B are flowcharts respectively illustrating processes of transmitting a CSI-RS by sub-cell 0 and sub-cell 1 according to an embodiment of the present disclosure.

Referring to FIG. 7A, a process of transmitting a CSI-RS by a sub-cell according to an embodiment of the present disclosure is illustrated. The sub-cell performing the process of FIG. 7A is assumed to be sub-cell 0 150.

At operation S710, sub-cell 0 transmits or indicates configuration information of a CSI-RS resource allocated by sub-cell 0 to a UE. The configuration information may include sub-frame subset related information, allocation pattern information in the sub-frame subset, and length information.

At operation S720, sub-cell 0 determines whether the current time point corresponds to the first timing.

If sub-cell 0 determines that the current time point corresponds to the first timing at operation S720, then sub-cell 0 proceeds to operation S730 at which sub-cell 0 transmits an NZP CSI-RS for channel measurement of sub-cell 0 to a preset resource position (e.g., RE).

In contrast, if sub-cell 0 determines that the current time point does not correspond to the first timing at operation S720, then sub-cell 0 proceeds to operation S740 at which sub-cell 0 determines whether the current time point corresponds to the second timing.

If sub-cell 0 determines that the current time point corresponds to the second timing at operation S740, then sub-cell 0 proceeds to operation S750 at which sub-cell 0 identifies the resource position at which the NZP CSI-RS of sub-cell 1 is configured in the second sub-frame subset 1 520.

Thereafter, at operation S760, sub-cell 0 allocates or applies random noise or Muted (ZP) CSI-RS to a resource position corresponding to the identified resource position at which the NZP CSI-RS of sub-cell 1 is set.

In contrast, if sub-cell 0 determines that the current time point does not correspond to the second timing at operation S740, then sub-cell 0 returns to operation S720.

Referring to FIG. 7B, a process of transmitting a CSI-RS by a sub-cell according to an embodiment of the present disclosure is illustrated. The sub-cell performing the process of FIG. 7B is assumed to be sub-cell 1 160.

At operation S770, sub-cell 1 transmits or indicates configuration information of a CSI-RS resource allocated by sub-cell 1 to a UE. The configuration information may include sub-frame subset related information, allocation pattern information in the sub-frame subset, and length information.

At operation S775, sub-cell 1 determines whether the current time point corresponds to the first timing.

If sub-cell 1 determines that the current time point corresponds to the first timing at operation S775, then sub-cell 1 proceeds to operation S780 at which sub-cell 1 identifies the resource position at which the NZP CSI-RS of sub-cell 0 is set in the first sub-frame subset 0 510. Thereafter, sub-cell 1 proceeds to operation S785

At operation S785, sub-cell 1 allocates or applies random noise or Muted (ZP) CSI-RS to a resource position corresponding to the identified resource position at which the NZP CSI-RS of sub-cell 0 is set.

In contrast, if sub-cell 1 determines that the current time point does not correspond to the first timing at operation S775, then sub-cell 1 proceeds to operation S790 at which sub-cell 1 determines whether the current time point corresponds to the second timing.

If sub-cell 1 determines that the current time point corresponds to the second timing at operation S790, then sub-cell 1 proceeds to operation S795 at which sub-cell 1 transmits an NZP CSI-RS for channel measurement of sub-cell 1 to a preset resource position (e.g., RE).

In contrast, if sub-cell 1 determines that the current time point does not correspond to the second timing at operation S790, then sub-cell 1 proceeds to operation S775.

Figure 8:
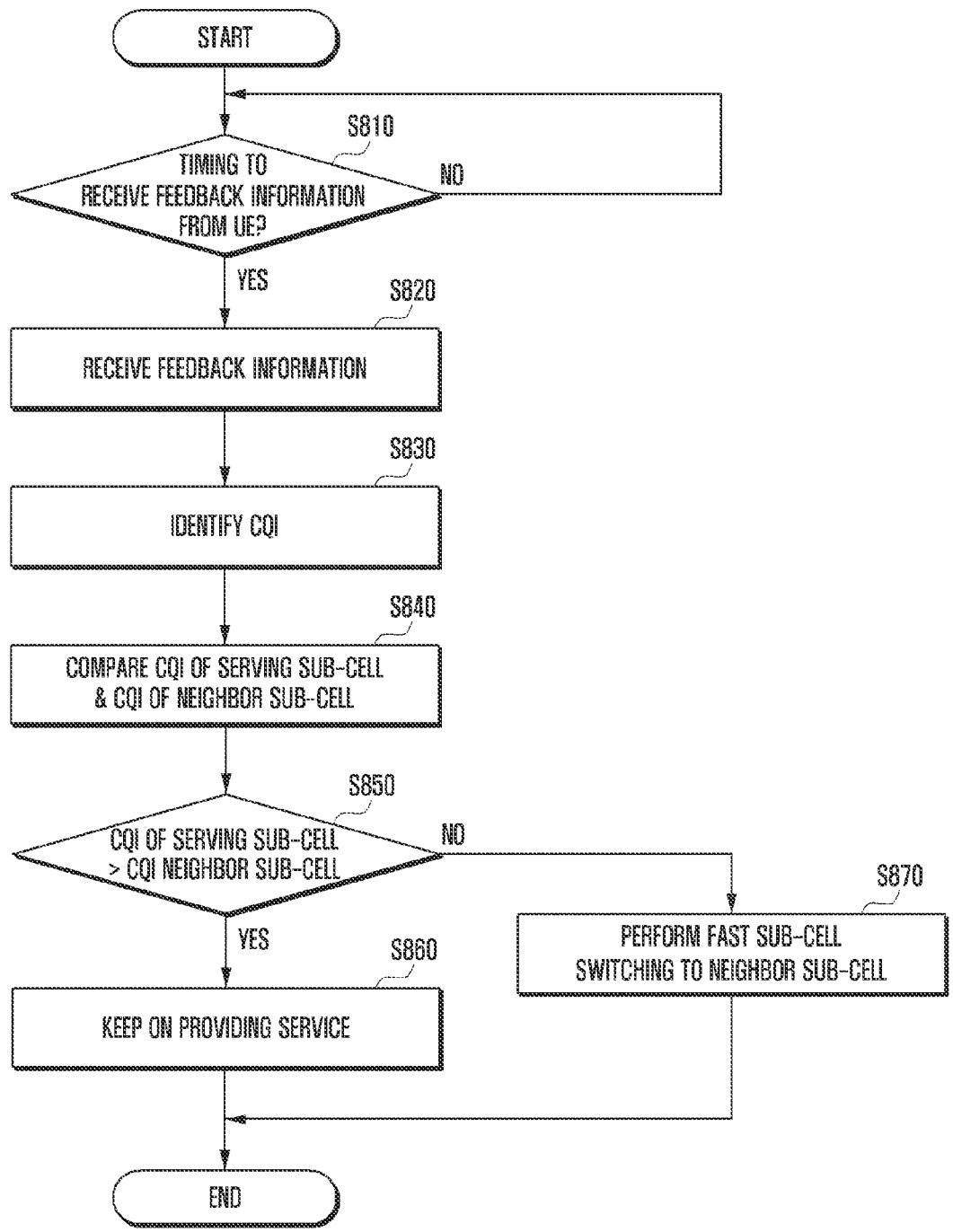
FIG. 8 is a flowchart illustrating a process of performing fast sub-cell switching using feedback information transmitted from a UE by a sub-cell according to an embodiment of the present disclosure.

FIG. 8 is a flowchart illustrating a process of performing fast sub-cell switching using feedback information transmitted from a UE by a sub-cell according to an embodiment of the present disclosure.

Referring to FIG. 8, at operation S810, the sub-cell determines whether the current time point corresponds to a timing for reception of feedback information (e.g., channel state information), from the UE.

If the sub-cell determines that the current time point does not corresponds to a timing for reception of feedback information at operation S810, then the sub-cell may continue to poll until a timing for reception of feedback information (e.g., channel state information), from the UE.

In contrast, if the sub-cell determines that the current time point corresponds to a timing for reception of feedback information at operation S810, then proceeds to operation S820 at which the sub-cell receives feedback information transmitted from the UE. The feedback information may include feedback information on a service sub-cell of the UE and feedback information on a dominant interference sub-cell of the UE.

At operation S830, the sub-cell identifies Channel Quality Information (CQI) on the serving sub-cell and the dominant interference sub-cell from the feedback information.

At operation S840, the sub-cell compares the CQI of the serving sub-cell and the CQI of the dominant interference sub-cell. Meanwhile, according to various embodiments of the present disclosure described above, although the characteristic of comparison of only the CQI among the feedback information received from the UE is discussed, the present disclosure is not limited to such a characteristic. For example, the sub-cell may use RI or PMI as well as the CQI included in the feedback information as a basis for determination of a fast sub-cell switching between sub-cells.

At operation S840, the sub-cell determines whether the CQI of the serving sub-cell is larger than the CQI of the dominant interference sub-cell.

If the sub-cell determines that the CQI of the serving sub-cell is larger than the CQI of the dominant interference sub-cell at operation S850, then the sub-cell proceeds to operation S860 at which the sub-cell may imply that the channel state between the serving sub-cell and the UE is better than the channel state between the dominant interference sub-cell and the UE.

Therefore, when the CQI of the serving sub-cell is larger than the CQI of the dominant interference sub-cell, the sub-cell (serving sub-cell) proceeds to operation S860 at which the serving sub-cell keeps on providing the service to the UE.

In contrast, if the sub-cell determines that the CQI of the serving sub-cell is smaller than (or equal to) the CQI of the dominant interference sub-cell at operation S850, then the sub-cell proceeds to operation S870 at which the sub-cell performs fast sub-cell switching from the serving sub-cell to the dominant interference sub-cell.

In general, in the case of a handover performed by a UE, determination as to whether to perform the handover may be based on a Reference Signal Received Power (RSRP) reported by the UE or an SRS power measured by an eNB, and RRC reconfiguration by a higher layer is required. Therefore, a time delay may occur in the handover performed by the UE.

In contrast, the fast sub-cell switching according to various embodiments of the present disclosure employs CQI instead of RSRP as a basis for the switching and does not require the RRC reconfiguration by a higher layer. Therefore, the present disclosure may achieve a high speed switching between sub-cells.

Figure 9:
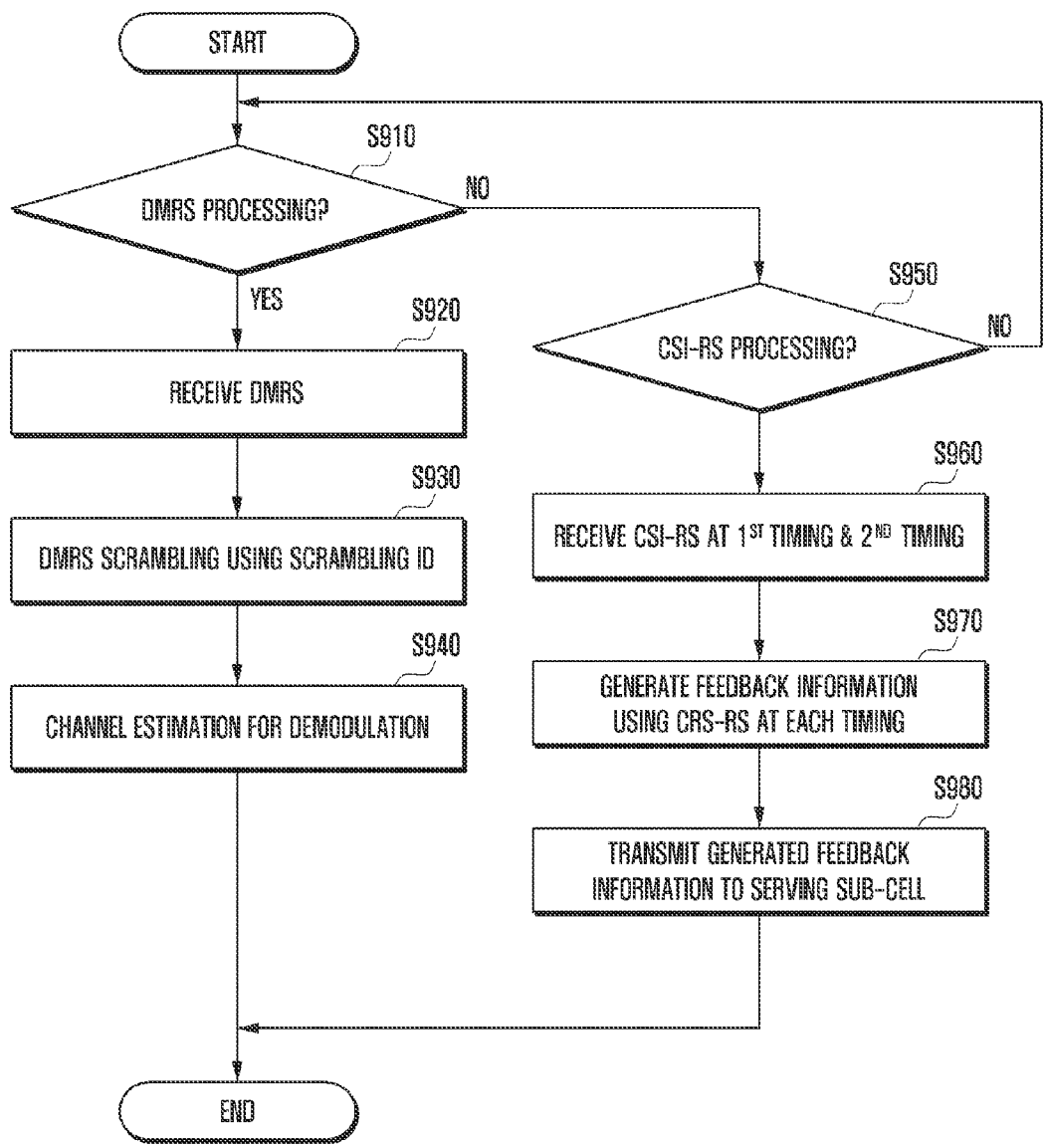
FIG. 9 is a flowchart illustrating an operation process of a UE according to an embodiment of the present disclosure.

FIG. 9 is a flowchart illustrating an operation process of a UE according to an embodiment of the present disclosure.

At operation S910, the UE determines whether to perform a DMRS processing.

If the UE determines that a DMRS processing is to be performed at operation S910, then the UE proceeds to operation S920 at which the UE receives a DMRS transmitted from the sub-cell. Further, at operation S930, the UE descrambles the DMRS by using scrambling IDentity (ID) information (nSCID) acquired from the sub-cell. The descrambling of the DMRS may imply detection of a DMRS for a corresponding sub-cell. Thereafter, the UE proceeds to operation S940.

At operation S940, the UE performs channel estimation for demodulation by using the DMRS. Thereafter, the UE may receive data based on a result of the channel estimation.

In contrast if the UE determines that a DMRS processing is not to be performed at operation S910, then the UE proceeds to operation S950 at which the UE determines whether to perform a CSI-RS processing.

If the UE determines that a CSI-RS processing is not to be performed at operation S950, then the UE proceeds to operation S910.

In contrast, if the UE determines that a CSI-RS processing is to be performed at operation S950, then the UE proceeds to operation S960 at which the UE receives a CSI-RS at a first timing and a second timing. Thereafter, the UE proceeds to operation S970.

At operation S970, the UE generates feedback information at each timing by using the CSI-RS at each timing. In other words, the UE generates first feedback information based on a channel state measured at a first timing and generates second feedback information based on a channel state measured at a second timing.

At operation S980, the UE transmits the first and second feedback information to the serving sub-cell at a predetermined timing. The feedback information transmitted to the serving sub-cell may be shared with an interference sub-cell or a central scheduler node.

Meanwhile, the above description of various embodiment of the present disclosure discusses one cell operation scenario for fast sub-cell switching between sub-cells having the same PCID when a UE may feed back only the CSI of a serving sub-cell and a dominant interference sub-cell and only the two sub-cells having the same PCID may be discriminated from each other in view of the DMRS and the CSI-RS.

However, various embodiments of the present disclosure are not limited to the one cell operation scenario including fast sub-cell switching in consideration of only two sub-cells having the same PCID due to the limitation in the capability of the UE and limitation of standards, and may be applied to one cell operation scenario including fast sub-cell switching in consideration of only three or more sub-cells.

Hereinafter, a method for fast sub-cell switching based on multiple CSI feedbacks of a UE wherein N (e.g., three or more) sub-cells having the same PCID in one macro cell are discriminated from each other in view of the DMRS and the CSI-RS will be described.

Figure 10:
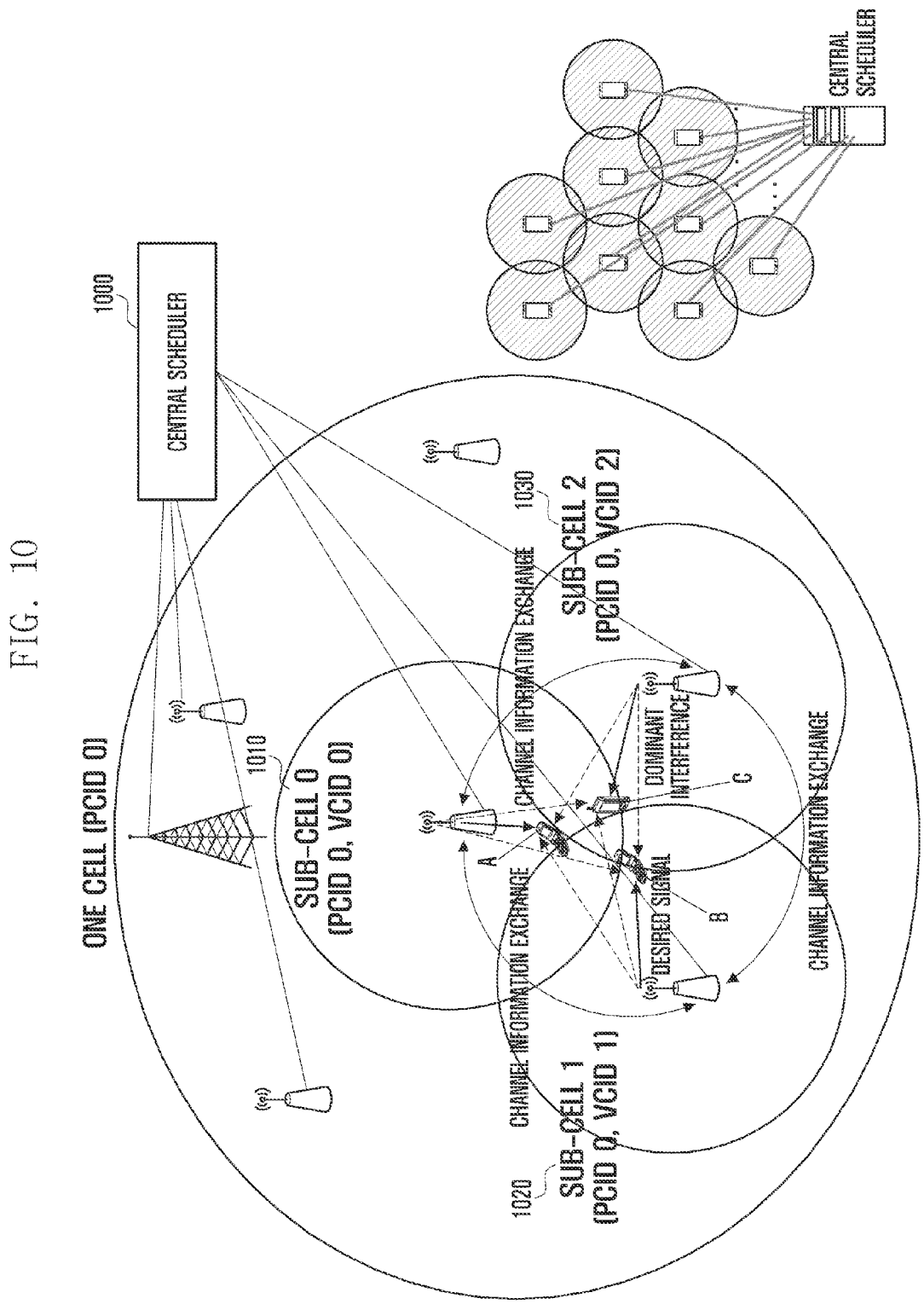
FIG. 10 is a block diagram illustrating a structure of a wireless communication system according to an embodiment of the present disclosure.

FIG. 10 is a diagram illustrating the structure of a wireless communication system according to an embodiment of the present disclosure. Specifically, FIG. 10 shows a fast small cell switching situation based on 3 CSI feedbacks.

In the following description of FIG. 10, a detailed description overlapping with the description of FIG. 1 will be omitted.

Referring to FIG. 10, sub-cells (RRHs, TPs, or small cells) within a macro coverage have the same PCID as that of the macro cell. Further, the individual sub-cells may share their channel information with each other through a central scheduler node 1000 or an X2 interface.

Sub-cell 0 1010, sub-cell 1 1020, and sub-cell 2 1030 transmit data to UEs to which they provide a service, respectively. For example, sub-cell 0 1010 transmits data to UE A, sub-cell 1 1020 transmits data to UE B, and sub-cell 2 1030 transmits data to UE C.

In this event, sub-cell 0 1010 causes a dominant interference to UE B and UE C, sub-cell 1 1020 causes a dominant interference to UE A and UE C, and sub-cell 2 1030 causes a dominant interference to UE A and UE B.

Meanwhile, in one cell operation scenario proposed based on the wireless communication system illustrated in FIG. 10, sub-cells within a macro coverage have the same PCID and thus need to be discriminated from each other. To this end, in the present embodiment of the present disclosure, a UE-specific virtual cell ID is applied specifically to a sub-cell. The virtual cell ID enables an inter-Transmission Point (TP) DMRS orthogonality interference randomization.

When the Virtual Cell ID (VCID) is employed, each of the sub-cells in a macro cell may be uniquely specified based on a PCID and a VCID. For example, cell identification may be performed based on a PCID and a TP-specific VCID.

Figure 11A:
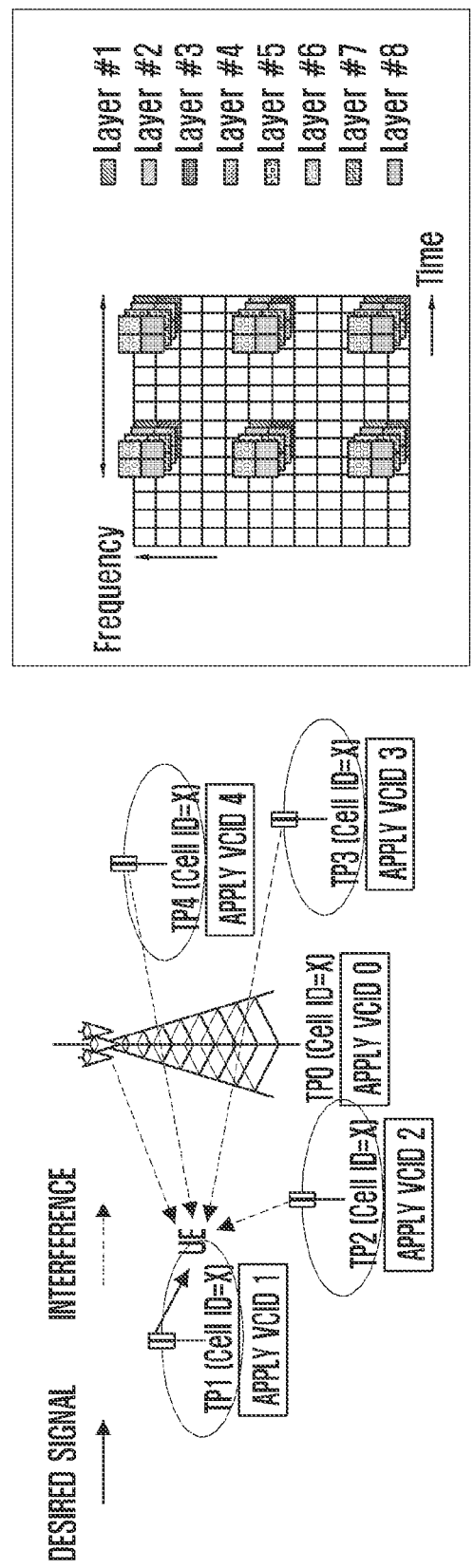
FIGS. 11A and 11B are diagrams illustrating DMRS configuration for supporting independent demodulation of UEs served by N number of sub-cells having a same PCID according to an embodiment of the present disclosure.
Figure 11B:
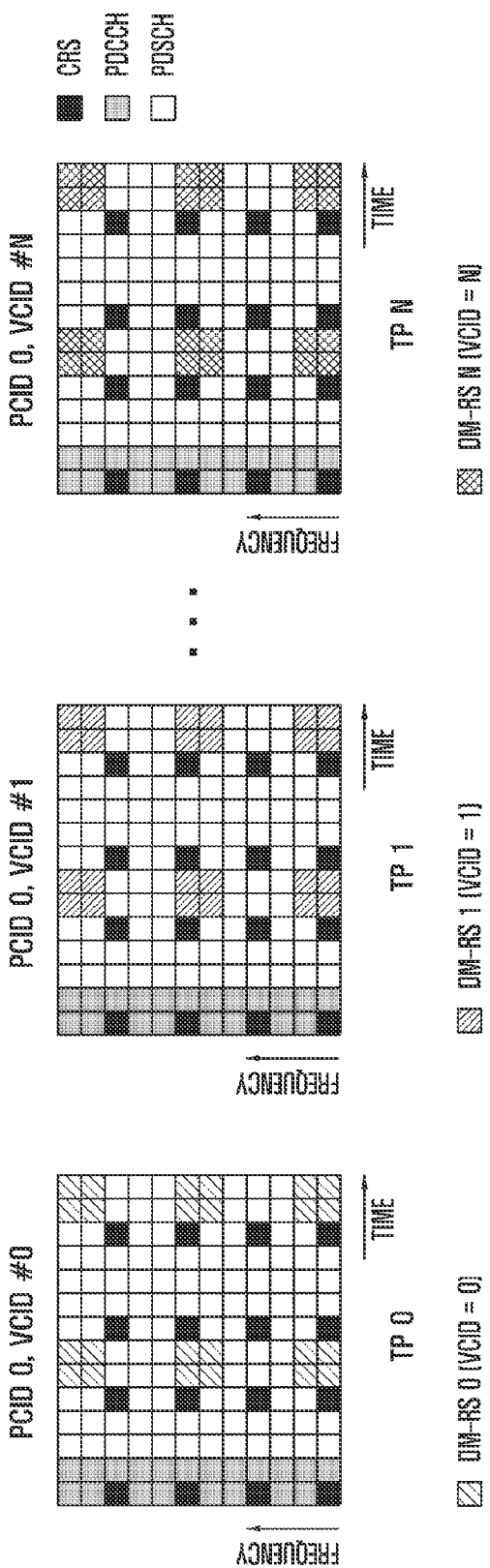

FIGS. 11A and 11B are diagrams illustrating DMRS configuration for supporting independent demodulation of UEs served by N number of sub-cells having a same PCID according to an embodiment of the present disclosure. For example, FIGS. 11A and 11B are diagrams illustrating a method in which a plurality of (N number of) sub-cells having the same PCID configure DMRSs for channel measurement in order to support independent demodulation of UEs according to an embodiment of the present disclosure, respectively.

Referring to FIGS. 11A and 11B, the sub-cells from sub-cell 0 to sub-cell N, which have the same PCID, apply different VCIDs instead of transmitting DMRS scrambling sequences to UEs to which the sub-cells respectively provide a service, so as to enable each of the UEs to perform individual demodulation.

As illustrated in FIG. 11A, the sub-cells from sub-cell (or TP) 0 to sub-cell 4 have the same cell ID X and different VCIDs. Therefore, each of the sub-cells applies a TP-specific VCID, which is specific to its own Transmission Point (TP), so that the sub-cells use different DMRS scrambling sequences.

FIG. 11B is a diagram illustrating a structure of radio resources (sub-frames) used by the sub-cells. As noted from FIG. 11B, the sub-cells from sub-cell 0 to sub-cell N transmit DMRSs through resources at the same position, different VCIDs are applied to DMRSs of the sub-cells, and the sub-cells thus use different DMRS scrambling sequences.

Therefore, even when neighbor sub-cells have the same PCID, different DMRS scrambling sequences are generated based on VCIDs, each of which is specific to a sub-cell, so that the sub-cells may exactly reflect interference thereof to each other in the PDSCH channel estimation of a UE. For example, according to various embodiments of the present disclosure, an interference randomization of different sub-cells having the same PCID may be achieved using DMRS scrambling sequences based on VCIDs.

Further, antenna ports 7 to 14 may be used to enable each sub-cell to support multi-layers of rank 2 or higher.

Figure 12:
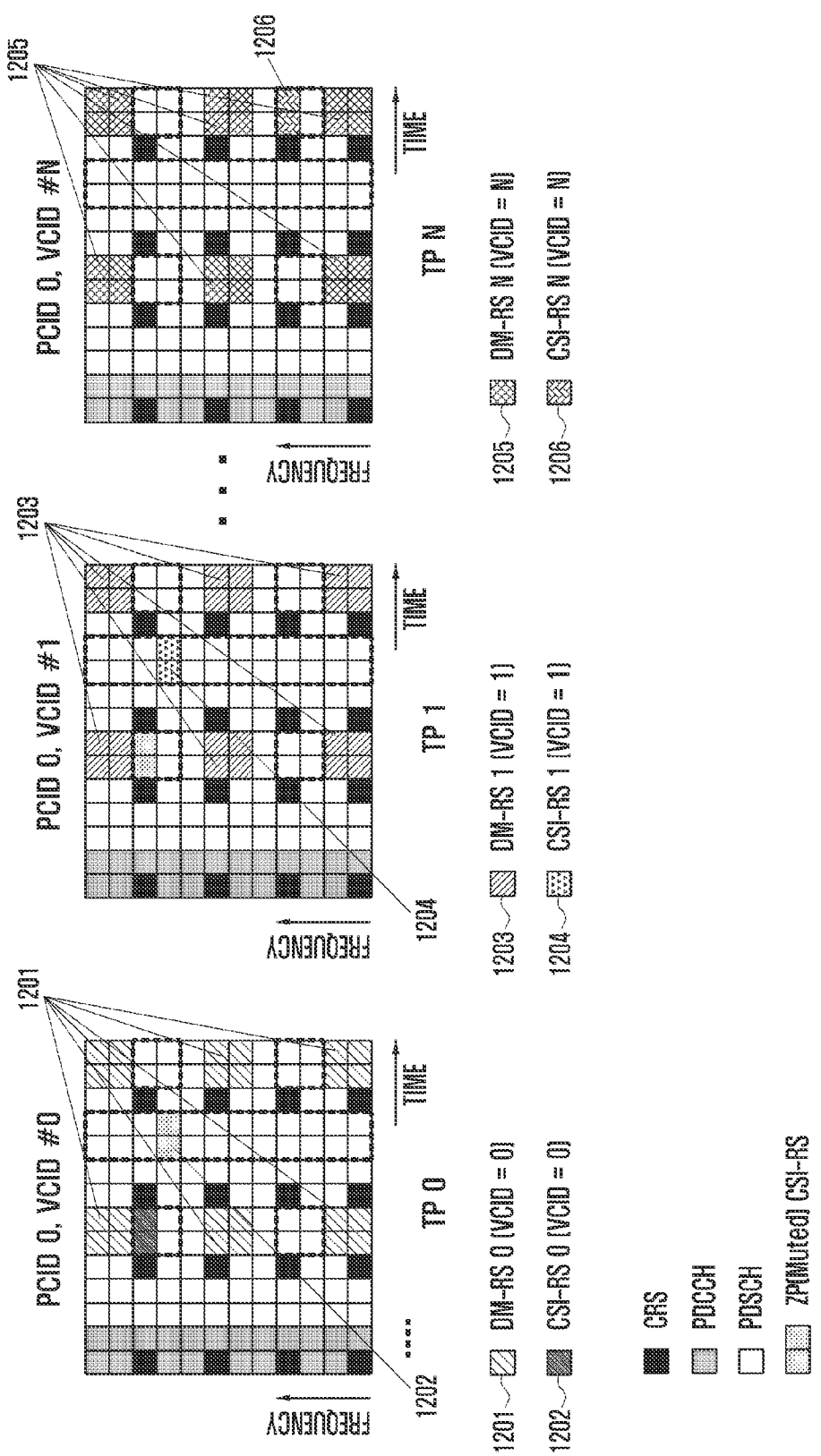
FIG. 12 is a diagram illustrating Non Zero Power (NZP) CSI-RS resource configuration by N sub-cells having the same PCID for exact channel measurement by each UE according to an embodiment of the present disclosure.

FIG. 12 is a diagram illustrating Non Zero Power (NZP) CSI-RS resource configuration by N sub-cells having the same PCID for exact channel measurement by each UE according to an embodiment of the present disclosure.

Referring to FIG. 12, sub-cell 0 to sub-cell N, having the same PCID, TP-specifically allocate NZP CSI-RS resources thereof for channel measurement to different RE positions, so as to enable each of UEs served by the sub-cell 0 to sub-cell N to achieve exact channel measurement.

More specifically, sub-cell 0 allocates NZP CSI-RS resources to PDSCH RE positions specific to sub-cell 0, sub-cell 1 allocates NZP CSI-RS resources to PDSCH RE positions specific to sub-cell 1, and sub-cell N allocates NZP CSI-RS resources to PDSCH RE positions specific to sub-cell N. In this event, the sub-cells according to various embodiments of the present embodiment apply VCIDs instead of PCIDs to NZP CSI-RS scrambling sequences. Basically, the NZP CSI-RS resources for channel measurement of TPs (sub-cells, RRHs, or small cells) by a UE are allocated to different PDSCH RE positions in order to avoid interference therebetween. However, even when the number of sub-cells (small cells, RRHs, TPs) having the same PCID deployed within a macro coverage exceeds the number of PDSCH resources allocated to one sub-frame to allow NZP CSI-RSs to be configured at the same PDSCH RE position, the sub-cells may be discriminated from each other based on the TP-specific VCIDs different each other.

Further, according to the present embodiment of the present disclosure, Muted CSI-RSs between sub-cells included in a CoMP measurement set for avoidance of interference may be configured for NZP CSI-RS transmission of different sub-cells having the same PCID. The CoMP measurement set corresponds to a set of TPs set to be reflected in CSI measurement and report by a UE, and may be configured up to a maximum of 3 sets according to the current standards. However, according to various embodiments of the present disclosure, it is needless to be always limited to 3 sets.

Based on a 2-Tx CSI-RS port, one sub-frame includes a maximum of 20 CSI-RS resources at different positions (e.g., in which CSI-RS 0 (e.g., VCID=0) 1202, CSI-RS 1 (e.g., VCID=1) 1204, and CSI-RS N (VCID=N) 1206 may be allocated). However, by applying different VCIDs to CSI-RSs configured at the same RE position, more than 20 sub-cells may be discriminated from each other. For example, by applying VCIDs (e.g., range: 0~503) to the CSI-RS scrambling sequences, it is theoretically possible to deploy 10,080 (e.g., calculated based on 20×504) sub-cells having the same PCID within a macro coverage in one sub-frame based on the 2-Tx CSI-RS port.

As illustrated in FIG. 12, DM-RS 0 (e.g., VCID=0) 1201, DM-RS 1 (e.g., VCID=1) 1203, and DM-RS N (VCID=N) 1205 may be allocated to same RE positions.

Figure 13:
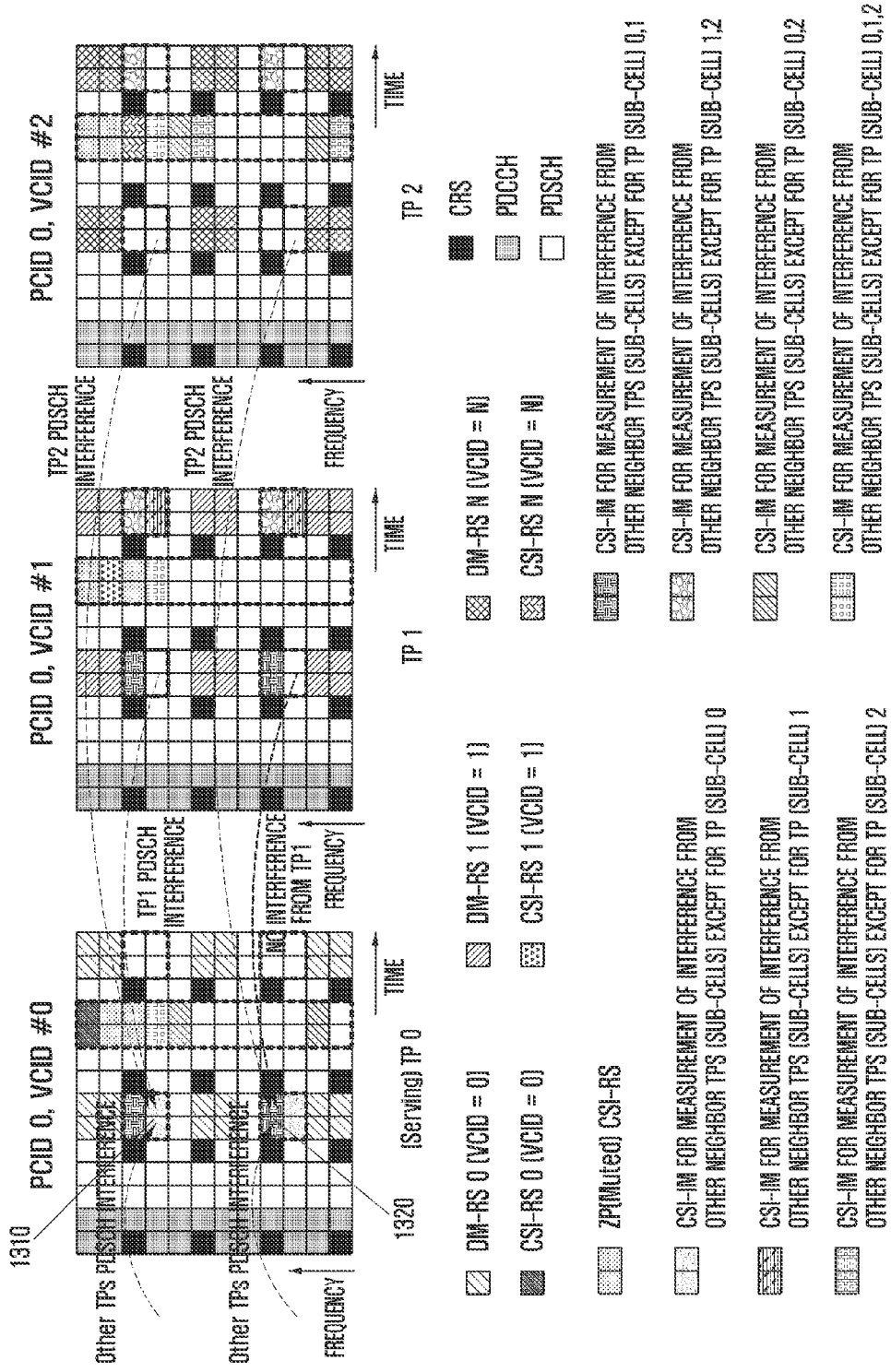
FIG. 13 is a diagram illustrating a method of CSI-Interference Measurement (CSI-IM) for supporting exact interference measurement by UEs of sub-cells having a same PCID according to an embodiment of the present disclosure.

FIG. 13 is a diagram illustrating a method of CSI-Interference Measurement (CSI-IM) for supporting exact interference measurement by UEs of sub-cells having a same PCID according to an embodiment of the present disclosure.

For example, FIG. 13 illustrates a CSI-IM resource configuration method for 7 cases of interference situations which may be taken into consideration in the case of three CoMP measurement sets.

Referring to FIG. 13, an eNB UE-specifically configures CSI-IM Resources (e.g., CSI-IMRs; ZP/Muted CSI-RS resources for interference measurement) at CSI-RS allocated RE positions of the PDSCH region, so as to enable UEs served by sub-cells having the same PCID to measure interference of neighbor sub-cells, especially sub-cells belonging to a CoMP measurement set in consideration of various interference situations. It is noted from FIG. 13 that the CoMP measurement set includes sub-set 0, sub-set 1, and sub-set 2, each sub-set transmits DMRSs and CSI-RSs to which VCIDs are applied, and CSI-IM resources allocated as noted from the resource elements hatched by slant lines. Allocation of a CSI-IM resource refers to a configuration of a ZP/Muted CSI-RS at a corresponding position. For convenience of description, a UE may be assumed to be served by sub-cell 0 (TP 0) has been subjected to a UE-specific CSI-IM configuration.

Specifically, at a ZP/Muted CSI-RS resource configuration position 1310 of sub-cell 0, a UE may measure by itself interferences from other sub-cells which are not included in sub-cell 1, sub-cell 2, and the CoMP measurement set. Further, at a ZP/Muted CSI-RS resource configuration position 1320 of sub-cell 0, CSI-IMs are configured at RE positions of sub-cell 1 identical to those of sub-cell 0, so that the UE may measure by itself interferences from other sub-cells which are not included in sub-cell 2 and the CoMP measurement set except for sub-cell 1.

By the method as described above, the UE may measure various interference information of sub-cells belonging to the CoMP measurement set through a CSI-IM configuration of an eNB.

In the embodiment of the present disclosure illustrated in FIG. 13, a maximum of 3 CSI-IMs may be configured for one UE, and one CSI-IM resource allocation has a granularity of 4 REs for each Physical Resource Block (PRB). The CSI-IM configuration enables CQI calculation according to blank on/off of each of the sub-cells included in a CoMP measurement set.

Figure 14:
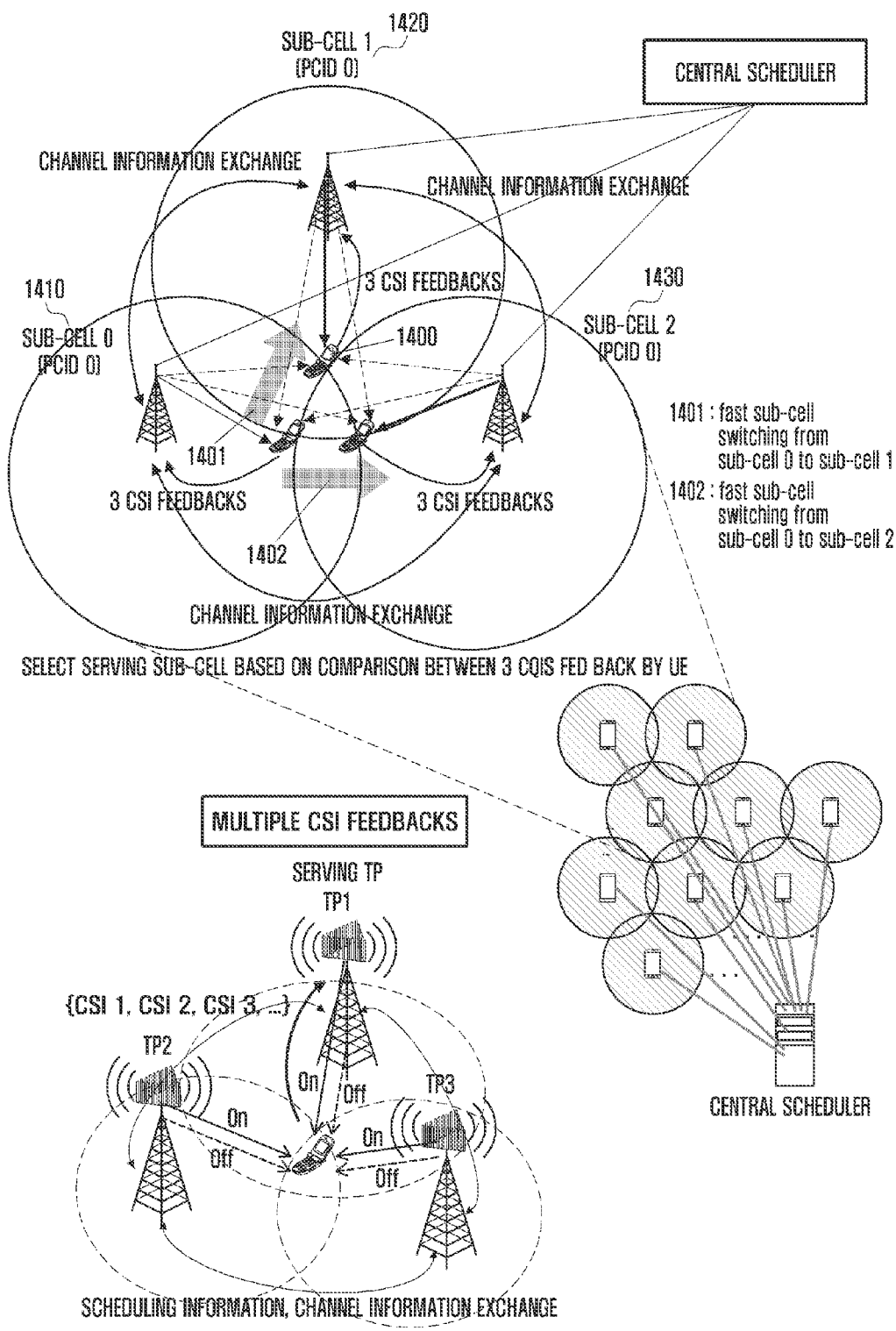
FIG. 14 is a diagram illustrating a method of performing fast sub-cell switching between sub-cells having a same PCID according to an embodiment of the present disclosure.

FIG. 14 is a diagram illustrating a method of performing fast sub-cell switching between sub-cells having a same PCID according to an embodiment of the present disclosure.

Referring to FIG. 14, sub-cell 0 1410, sub-cell 1 1420, and sub-cell 2 1430 receive multiple pieces of feedback information on a serving sub-cell and neighbor sub-cells from UEs by using multiple CSI feedbacks proposed by various embodiments of the present disclosure. For example, sub-cell 1 1420 receives CSI information on sub-cell 1 1420, CSI information on sub-cell 0 1410, and CSI information on sub-cell 2 1430, which are fed back or reported by a UE 1400 served by sub-cell 1 1420 itself. In this event, the UE 1400 may simultaneously report CSI information on sub-cell 1 1420, CSI information on sub-cell 0 1410, and CSI information on sub-cell 2 1430 to the serving sub-cell. Otherwise, according to various embodiments of the present disclosure, when the UE is incapable of simultaneously transmitting multiple pieces of feedback information or the simultaneous transmission itself is impossible, the UE may alternately report the CSI information of the sub-cells to the serving sub-cell.

Specifically, the Channel State Information (CSI) may include a Channel Quality Indicator (CQI), a Precoding Matrix Index (PMI), and a Rank Indicator (RI). In this event, the UE reports feedback information on the serving sub-cell thereof and dominant interference neighbor sub-cell to the serving sub-cell. Further, each of the sub-cells determines whether to perform a switching between sub-cells, based on the multiple pieces of feedback information received from the UE.

As described above, a sub-cell performs sub-cell switching based on a comparison between (at least) three pieces of feedback information [e.g., CSI(CQI/PMI/RI)] received from a UE. A comparison between (at least) three pieces of feedback information [e.g., CSI(CQI/PMI/RI)] is performed for fast switching between sub-cells because it is general that the fast switching between sub-cells frequently occurs at an area in which three sub-cells overlap with each other.

In the various embodiments of the present disclosure as described above, because determination as to whether to perform switching between sub-cells is based on CSI reported by a UE, a higher layer Radio Resource Control (RRC) reconfiguration is not necessary. Therefore, fast switching between sub-cells may be achieved.

In this event, whether to perform switching of a UE between sub-cells may be determined by each sub-cell based on an X2 interface or a central scheduler node connected to each sub-cell.

Meanwhile, in the various embodiments of the present disclosure described above, a UE reports three pieces of feedback information to the serving sub-cell. However, various embodiments of the present disclosure are not limited to such a configuration. In the current standards, in the case of taking three Transmission Points (e.g., TPs; sub-cells, RRHs, or small cells) into consideration, a maximum of four pieces of CSI (CQI/PMFRI) may be fed back.

Further, various embodiments of the present disclosure propose a method of reporting four pieces or more of feedback information (e.g., CSI). In the case of employing a sub-frame sub-set as described above with reference to FIG. 5, a maximum of eight pieces of CSI may be fed back. For example, because the standards allows a maximum of 8 pieces of CSI as CSI necessary for determination of fast switching between sub-cells (e.g., TPs, RRHs, or small cells), various embodiments of the present disclosure may guarantee a seamless mobility of a UE in a dense small cell environment between sub-cells. A method of measuring and feeding back a maximum of 8 pieces of CSI in consideration of three TPs (e.g., sub-cells, RRHs, or small cells) by a UE will now be described in detail with reference to FIG. 15.

Figure 15:
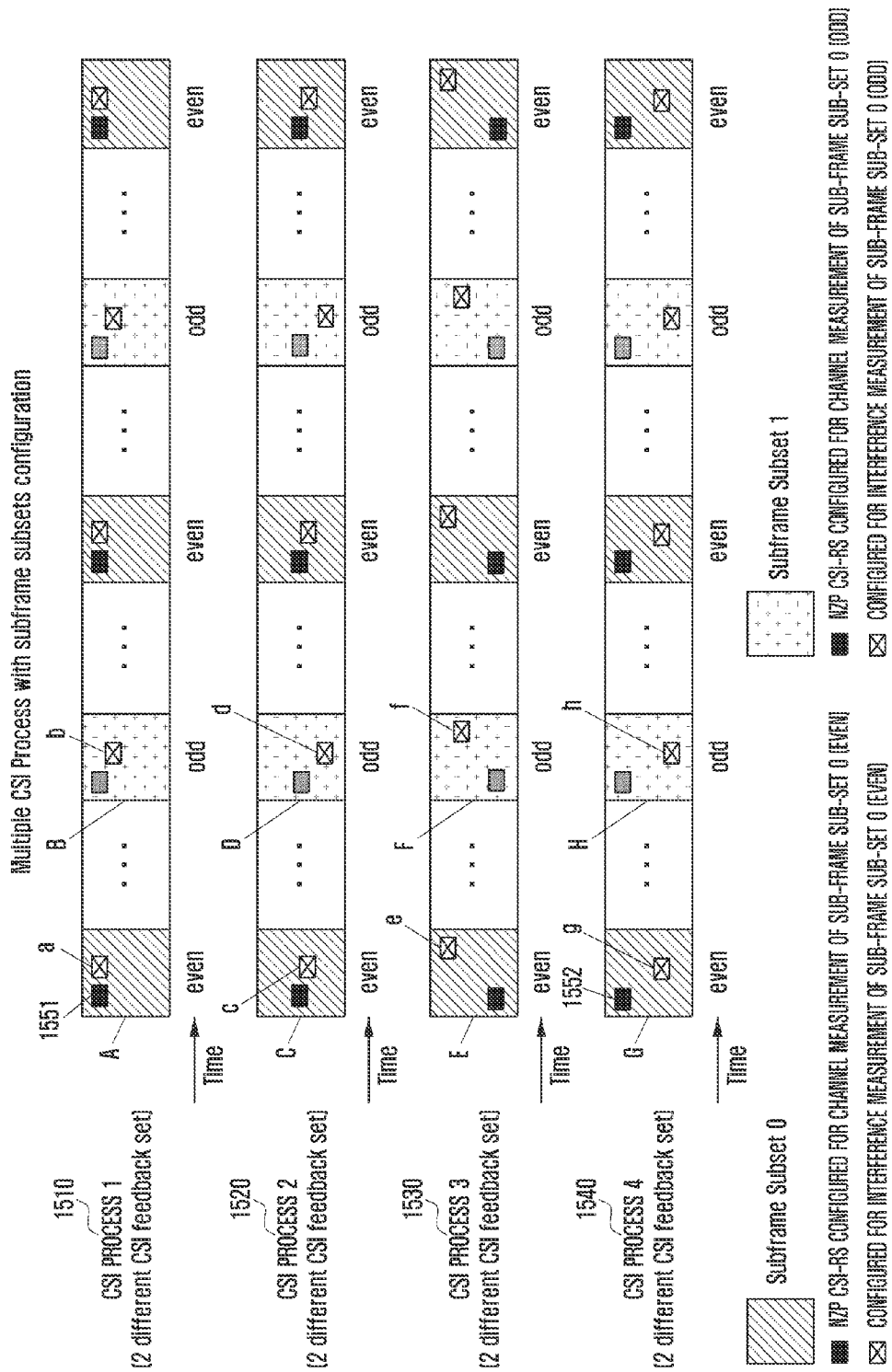
FIG. 15 is a diagram illustrating a method of measuring and feeding back a maximum of 8 pieces of CSI in consideration of three Transmission Points (TPs) by a UE according to an embodiment of the present disclosure.

FIG. 15 is a diagram illustrating a method of measuring and feeding back a maximum of 8 pieces of CSI in consideration of three TPs by a UE according to an embodiment of the present disclosure.

As described above, in the case of taking three TPs (e.g., sub-cells, RRHs, or small cells) into consideration according to the present embodiment, a UE may measure and feed back a maximum of 8 pieces of CSI. Referring to FIG. 15, a specific example employed in order to describe a method of feeding back 8 pieces of CSI by a UE is illustrated.

Various embodiments of the present disclosure use multiple CSI processes and sub-frame sub-sets as described above with reference to FIG. 5. For example, an eNB may configure information on three TP-specific NZP CSI-RS resources and information on eight UE-specific CSI-IM resources for each UE. Based on the configuration provided by the eNB, the UE measures the eight different pieces of CSI (including CQI) and feeds back the measured information to the serving sub-cell thereof.

More specifically, it is noted from CSI process #1 1510, CSI process #2 1520, CSI process #3 1530, and CSI process #4 1540 shown in FIG. 15 that there are three resource positions at which NZP CSI-RSs for channel measurement of the UE are transmitted. In this event, it should be noted that the resource position 1551 configured for the NZP CSI-RS transmission resource of CSI process #1 and the resource position 1552 configured for the NZP CSI-RS transmission resource of CSI process #4 are identical to each other. The resource position configured for the NZP CSI-RS transmission resource of CSI process #4 may be identical to the resource position configured for the NZP CSI-RS transmission resource of CSI process #2 or the resource position configured for the NZP CSI-RS transmission resource of CSI process #3. Further, it is noted from CSI process #1 1510 to CSI process #4 1540 that all the CSI-IM resources for interference measurement of a UE have been configured at different RE positions (e.g., a, b, c, d, e, f, g, and h). The CSI process may refer to association between three TP-specific NZP CSI-RS resources for channel measurement and eight UE-specific CSI-IM resources for interference measurement.

Referring to the plurality of CSI processes 1510 to 1540 having the sub-frame sub-set configuration, it is noted that eight cases of CSI measurements A, B, C, D, E, F, G, and H are derived.

According to various embodiments of the present disclosure, a maximum of eight pieces of CSI may be fed back based on the illustrated CSI measurement method.

Figure 16:
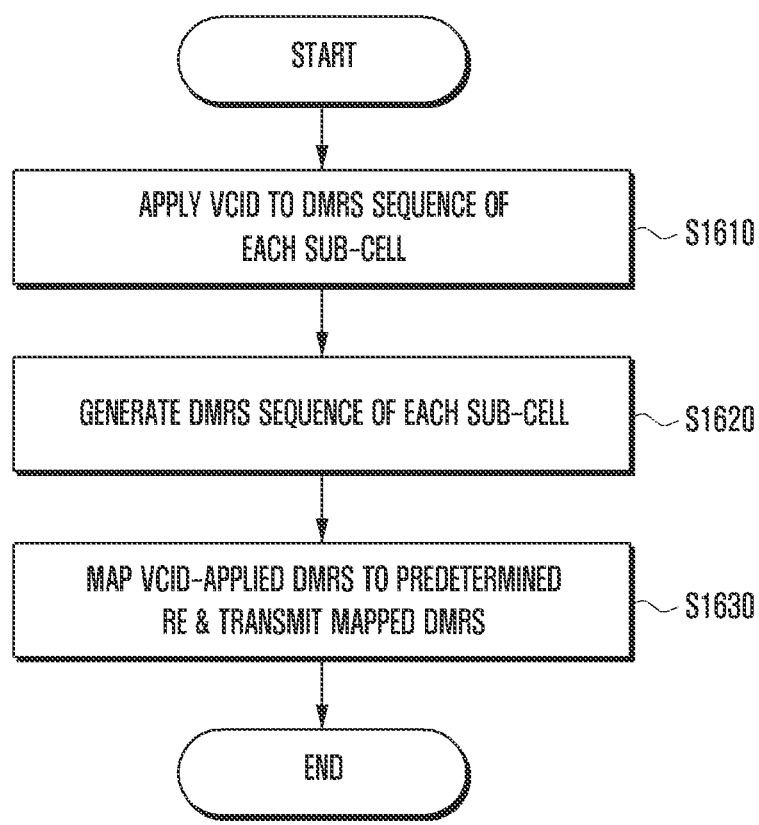
FIG. 16 is a flowchart illustrating a process of transmitting a DMRS for channel estimation of a UE by each sub-cell according to an embodiment of the present disclosure.

FIG. 16 is a flowchart illustrating a process of transmitting a DMRS for channel estimation of a UE by each sub-cell according to an embodiment of the present disclosure. For example, FIG. 16 illustrates a sequence of the DMRS configuration operation of each sub-cell shown in FIG. 11.

At operation S1610, each sub-cell (which may be also referred to as RRH, TP, or small cell) applies a sub-cell-specific Virtual Cell ID (VCID) to a DMRS sequence of each sub-cell.

Thereafter, at operation S1620, each sub-cell generates a DMRS sequence of each sub-cell.

At operation S1630, each sub-cell maps a DMRS, to which a sub-cell-specific VCID has been applied, to a predetermined RE and then transmits the DMRS to the UE.

Figure 17:
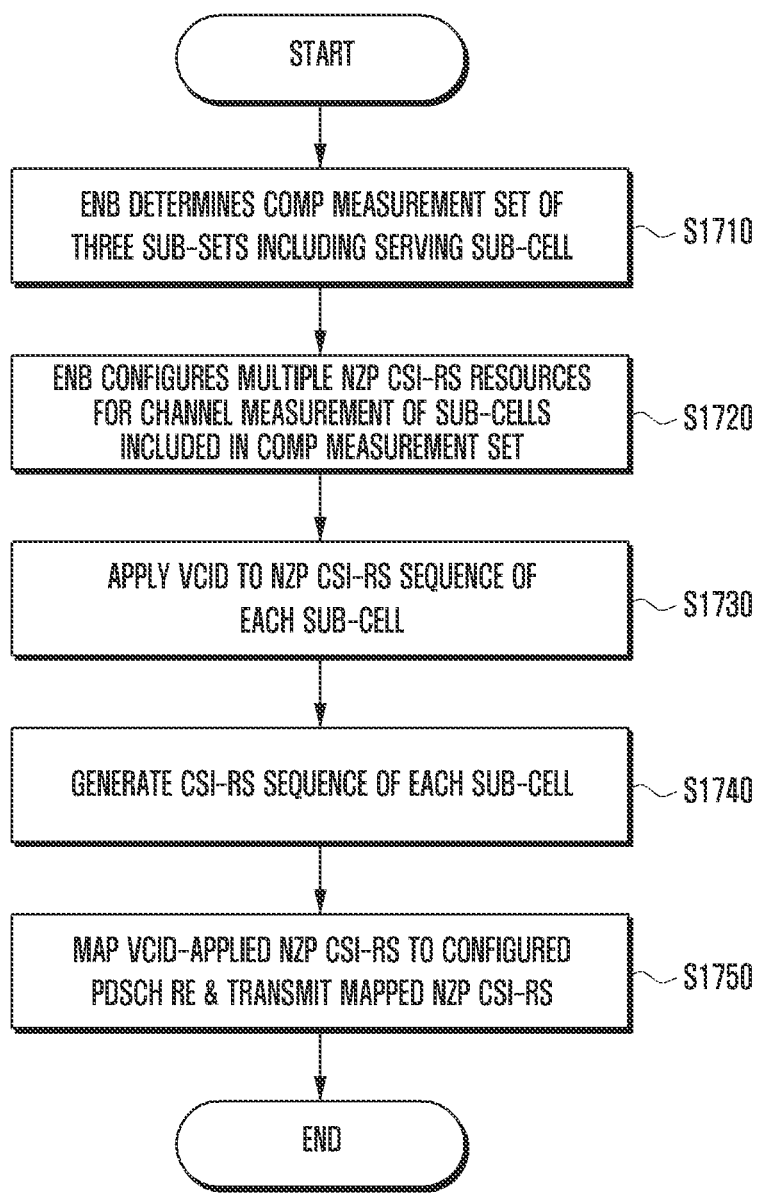
FIG. 17 is a flowchart illustrating a process of transmitting a NZP CSI-RS for channel measurement of a UE by each sub-cell according to an embodiment of the present disclosure.

FIG. 17 is a flowchart illustrating a process of transmitting a NZP CSI-RS for channel measurement of a UE by each sub-cell according to an embodiment of the present disclosure. For example, FIG. 17 illustrates a sequence of the NZP CSI-RS configuration operation of each sub-cell shown in FIG. 12.

At operation S1710, an eNB determines a CoMP measurement set and indicates the determined set to each UE through sub-cells. The CoMP measurement set may be configured by three sub-cells including a serving sub-cell based on an SRS power measured by the eNB or RSRP (e.g., RSRP based on CSI-RS) reported by the UE.

At operation S1720, the eNB configures a plurality of NZP CSI-RS resources for channel measurement of the sub-cells included in the CoMP measurement set.

At operation S1730, each sub-cell applies a VCID to an NZP CSI-RS sequence of each sub-cell.

At operation S1740, each sub-cell generates a CSI-RS sequence of each sub-cell.

At operation S1750, each sub-cell maps an NZP CSI-RS, to which the VCID has been applied, to a PDSCH RE configured by the eNB and transmits the mapped NZP CSI-RS.

Figure 18:
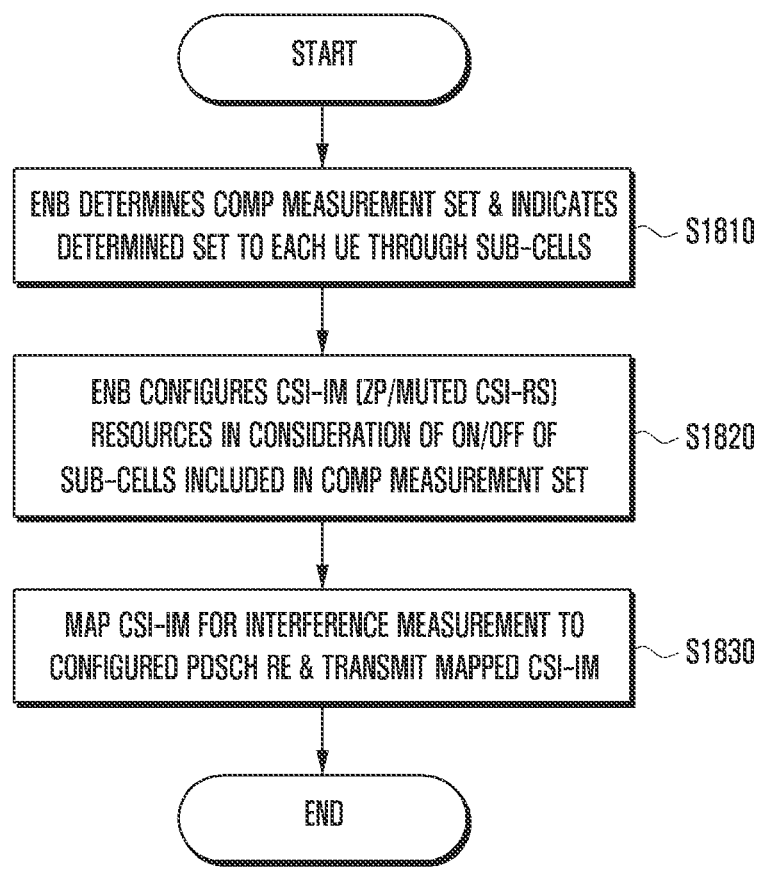
FIG. 18 is a flowchart illustrating a process of transmitting a CSI-IM for interference measurement of a UE through each sub-cell by an eNB according to an embodiment of the present disclosure.

FIG. 18 is a flowchart illustrating a process of transmitting a CSI-IM for interference measurement of a UE through each sub-cell by an eNB according to an embodiment of the present disclosure. For example, FIG. 18 illustrates a sequence of the CSI-IM configuration operation of each sub-cell shown in FIG. 13.

At operation S1810, an eNB determines a CoMP measurement set and indicates the determined set to each UE through sub-cells. The CoMP measurement set may be configured by three sub-cells including a serving sub-cell based on an SRS power measured by the eNB or RSRP (e.g., RSRP based on CSI-RS) reported by the UE.

At operation S1820, the eNB configures, UE-specifically, CSI-IM (e.g., ZP/Muted CSI-RS) resources in consideration of on/off of the sub-cells included in the CoMP measurement set through the sub-cells included in the CoMP measurement set.

At operation S1830, each of the sub-cells belonging to the CoMP measurement set maps a CSI-IM for interference measurement to a PDSCH RE configured by the eNB and transmits the mapped CSI-IM.

Figure 19:
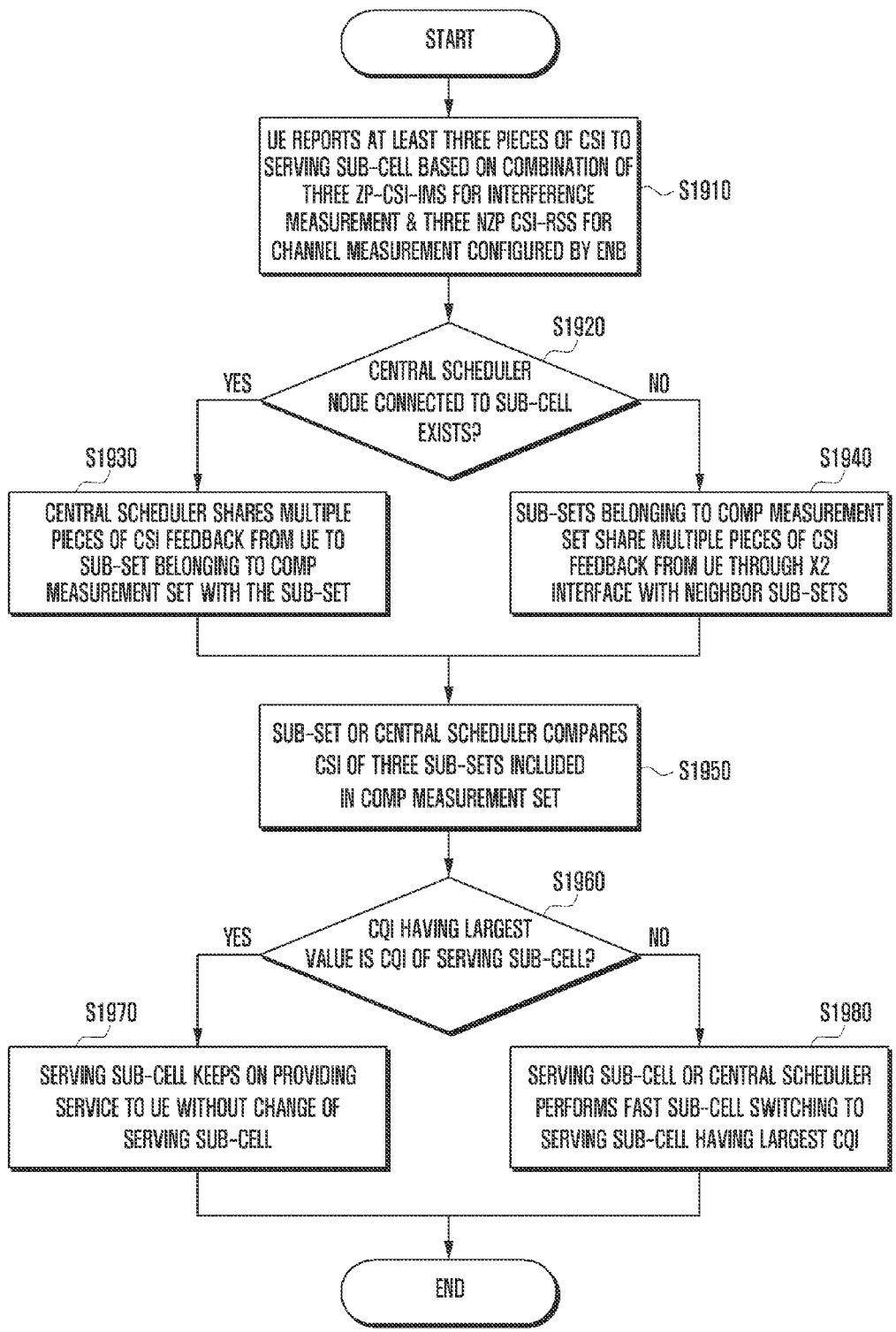
FIG. 19 is a flowchart illustrating a process of performing fast sub-cell switching using feedback information transmitted from a UE by a sub-cell according to an embodiment of the present disclosure.

FIG. 19 is a flowchart illustrating a process of performing fast sub-cell switching using feedback information transmitted from a UE by a sub-cell according to an embodiment of the present disclosure.

At operation S1910, a UE reports at least three pieces of CSI or feedback information to a serving sub-cell based on a combination of three ZP-CSI-IMs for interference measurement and three NZP CSI-RSs for channel measurement configured by an eNB. In the three ZP-CSI-IMs for interference measurement and the three NZP CSI-RSs for channel measurement, it should be noted that the word "three" corresponds to only an embodiment of the present disclosure which is not limited to the word "three". As described above, a UE according to various embodiments of the present disclosure may feed back a maximum of 8 pieces of CSI-RS sets based on the CSI-IMs and the NZP CSI-RSs.

According to various embodiments of the present disclosure CSI may include CQI, RI, PMI, and the like.

At operation S1920, the sub-cell determines whether a central scheduler node is connected to the sub-cell.

If the sub-cell determines that a central scheduler node is connected to the sub-cell at operation S1920, then the process proceeds to operation S1930 at which the central scheduler shares multiple pieces of CSI, which are fed back from the UE to a sub-set belonging to the CoMP measurement set, with the sub-set.

In contrast, if the sub-cell determines that a central scheduler node is not connected to the sub-cell at operation S1920, then the process proceeds to operation S1940 at which the sub-sets belonging to the CoMP measurement set share multiple pieces of CSI, which are fed back from the UE through an X2 interface, and the like, with neighbor sub-sets.

At operation S1950, the sub-set or the central scheduler compares CSI of three sub-sets included in the CoMP measurement set. In this event, the sub-set or the central scheduler may compare the channel states based on the CQI values included in the CSI fed back by the UE.

Further, three or more RSRPs fed back by a UE based on discovery signals transmitted from the sub-cells included in the CoMP measurement set may be used in determining whether to perform fast sub-cell switching between sub-cells. The discovery signal may be generated based on an existing PSS/SSS, CRS, Positioning Reference Signal (PRS), CSI-RS, or new discovery signal, and may be transmitted from a sub-cell in a dormant state.

At operation S1960, the sub-set or the central scheduler determines whether a CQI having the largest value is a CQI of the serving sub-cell.

If the sub-set or the central scheduler determines that the CQI having the largest value is the CQI of the serving sub-cell at operation S1960, then the process proceeds to operation S1970 at which the serving sub-cell continues to provide a service to the UE without change of the serving sub-cell.

In contrast, if the sub-set or the central scheduler determines that the CQI having the largest value is not the CQI of the serving sub-cell at operation S1960, then the process proceeds to operation S1980 at which the serving sub-cell or the central scheduler performs fast sub-cell switching to the serving sub-cell having the largest CQI.

Although FIG. 19 is based on an assumption that a UE has three neighbor sub-cells including a serving sub-cell, it should be noted that the present disclosure is not limited to three sub-cells and is applicable to N sub-cells.

Figure 20:
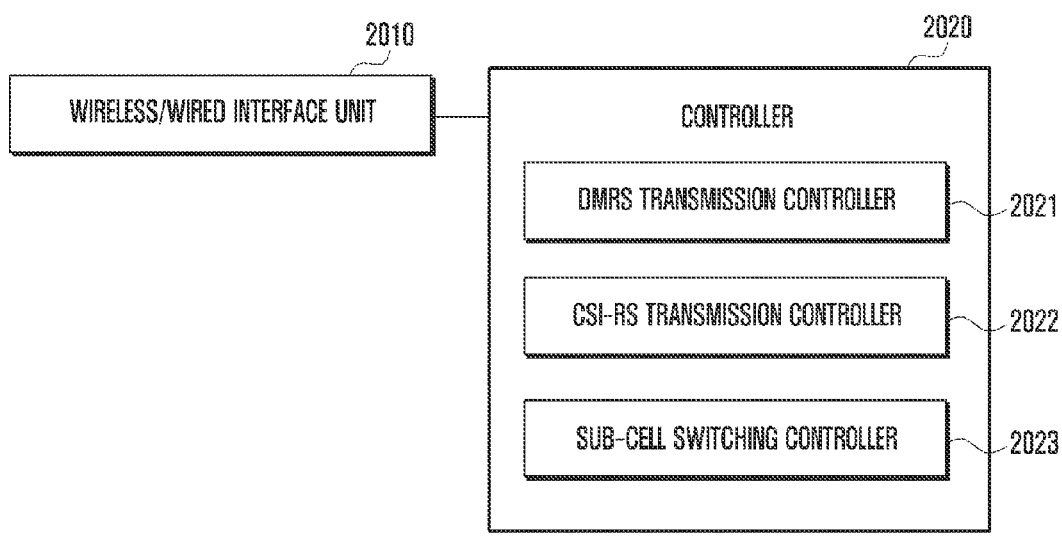
FIG. 20 is a block diagram illustrating an internal structure of a sub-cell according to an embodiment of the present disclosure.

FIG. 20 is a block diagram illustrating an internal structure of a sub-cell according to an embodiment of the present disclosure.

Referring to FIG. 20, a sub-cell may include a wireless/wired interface unit 2010 and a controller 2020.

The wireless/wired interface unit 2010 may include a wireless communication unit for performing a wireless communication with a UE and a wired communication unit for performing a wired communication with a central scheduler node or nodes of a core network.

The controller 2020 controls signal flow between blocks so as to enable the sub-cell to transmit a DMRS or a CSI-RS and perform fast sub-cell switching. According to various embodiments of the present disclosure, the controller 2020 may include a DMRS transmission controller 2021, a CSI-RS transmission controller 2022, and a sub-cell switching controller 2023.

When sub-cells in one macro cell use the same physical cell identifier, the DMRS transmission controller 2021 generates a DMRS scrambling sequence and applies different sub-cell-specific scrambling IDs (nSCIDs) 0 or 1 to the generated DMRS scrambling sequence according to an embodiment of the present disclosure. By applying different sub-cell-specific scrambling IDs (nSCIDs) to the DMRS scrambling sequence as described above, various embodiments of the present disclosure may reflect interference of neighbor sub-cells in the channel estimation of the UE even when the neighbor sub-cells have the same PCID.

Further, according to various embodiments of the present disclosure, when sub-cells within one macro cell may be discriminated from each other using VCIDs, the DMRS transmission controller 2021 performs a control to generate a DMRS to which the VCIDs are applied, map the generated DMRS to a predetermined resource, and transmit the mapped DMRS to the UE.

When sub-cells within one macro cell use the same physical cell identifier, the CSI-RS transmission controller 2022 transmits configuration information for CSI-RS transmission to the UE according to various embodiments of the present disclosure. Further, when the sub-cell of the CSI-RS transmission controller 2022 is a serving sub-cell, the CSI-RS transmission controller 2022 transmits a CSI-RS at a predetermined resource position (or RE) at a first timing. In contrast, at a second timing, the CSI-RS transmission controller 2022 allocates or applies a random noise or Muted (ZP) CSI-RS to a resource position in sub-frame sub-set 0 corresponding to a resource position to which a CSI-RS has been allocated in sub-frame sub-set 1.

Further, according to various embodiments of the present disclosure, when sub-cells within one macro cell may be discriminated from each other using VCIDs, the CSI-RS transmission controller 2022 performs a control to generate a CSI-RS to which the VCIDs are applied and transmit the generated CSI-RS to the UE based on the configuration information. According to various embodiments of the present disclosure, the CSI-RS transmission controller 2022 may determine a CoMP measurement set including a serving sub-cell or neighbor sub-cells of a UE and transmit configuration information on channel measurement information reference signal resources for channel measurement of sub-cells included in the CoMP measurement set to the UE.

The sub-cell switching controller 2023 receives feedback information on an interference sub-cell to the UE and feedback information on the serving sub-cell fed back from the UE. According to various embodiment of the present disclosure, the sub-cell switching controller 2023 may receive multiple pieces (specifically, two pieces to eight pieces or more pieces) of feedback information. Then, the sub-cell switching controller 2023 identifies CQI on the serving sub-cell and the interference sub-cell and compares CQI of the serving sub-cell and CQI of interference sub-cells.

Further, when the CQI of the serving sub-cell is smaller than the CQI of the interference sub-cell, the sub-cell switching controller 2023 performs a control to perform fast sub-cell switching from the serving sub-cell to the interference sub-cell.

Meanwhile, according to various embodiment of the present disclosure, as described above, the sub-cell may perform cell identification based on a PCID and a TP-specific VCID.

Figure 21:
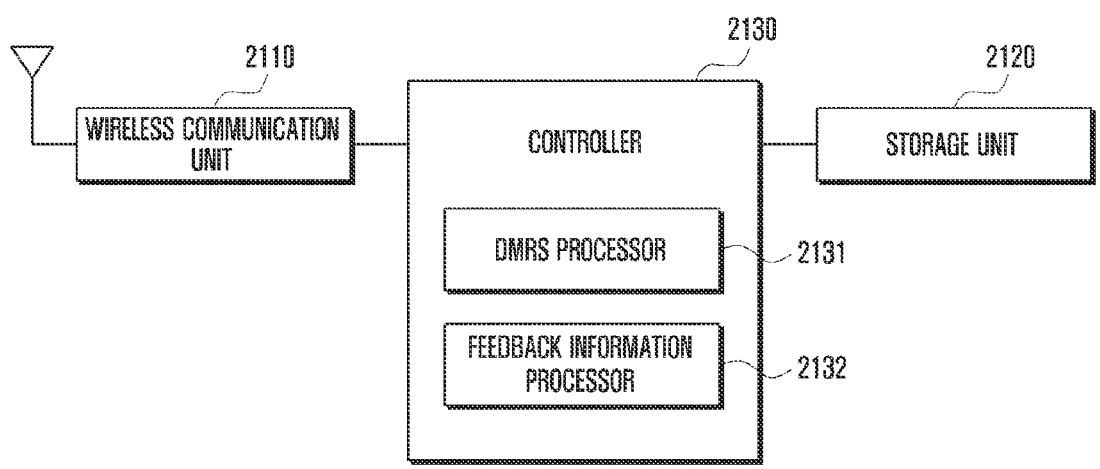
FIG. 21 is a block diagram illustrating the internal construction of a UE according to an embodiment of the present disclosure.

FIG. 21 is a block diagram illustrating the internal construction of a UE according to an embodiment of the present disclosure.

Referring to FIG. 21, a UE of the present disclosure may include a wireless communication unit 2110, a storage unit 2120, and a controller 2130.

The wireless communication unit 2110 performs transmission or reception of data for wireless communication of the UE. The wireless communication unit 2110 may include a Radio Frequency (RF) transmitter for up-converting and amplifying a frequency of a transmitted signal and an RF receiver for low-noise amplifying a received signal and down-converting a frequency of the received signal. Further, the wireless communication unit 2110 may receive data through a wireless channel and output the received data to the controller 2130, and may transmit data output from the controller 2130 through a wireless channel.

The storage unit 2120 stores programs and data necessary for operations of the UE.

The controller 2130 controls a procedure of a UE to receive and process a DMRS and a CSI-RS and generate and report feedback information on a serving sub-cell and an interference sub-cell. According to various embodiments of the present disclosure, the controller 2130 may include a DMRS processor 2131 and a feedback information processor 2132.

The DMRS processor 2131 receives a DMRS transmitted from a sub-cell and descrambles the DMRS by using a scrambling identifier (nSCID) acquired from the sub-cell. The descrambling of the DMRS may imply detection of a DMRS for a corresponding sub-cell.

The feedback information processor 2132 receives a CSI-RS at a first timing and a second timing. Further, by using the CSI-RS at each timing, the feedback information processor 2132 generates first feedback information based on a channel state measured at the first timing and generates second feedback information based on a channel state measured at the second timing. Further, the feedback information processor 2132 transmits the generated first and second feedback information to the serving sub-cell at a predetermined timing.

According to various embodiments of the present disclosure, fast sub-cell switching between sub-cells may be achieved without CRS interference in a wireless communication system in which one or more cells located within a macro coverage use the same physical cell identifier as that of a macro eNB. Therefore, various embodiments of the present disclosure may maximize the cell edge performance and the transmission efficiency and may minimize the frequency of occurrence of handover, so as to guarantee the seamless mobility of a UE.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of supporting fast sub-cell switching by a sub-cell included in a macro coverage in a wireless communication system, the method comprising:
receiving multiple pieces of feedback information on multiple sub-cells from a User Equipment (UE);
extracting channel quality indicators from the multiple pieces of received feedback information, respectively;
comparing values of the extracted channel quality indicators; and
determining, based on a result of the comparison of the values of the extracted channel quality indicators, whether to perform fast sub-cell switching of the UE,
wherein the determining of whether to perform fast sub-cell switching of the UE comprises:
determining whether a channel quality indicator having a largest value among the extracted channel quality indicators is a channel quality indicator of a serving sub-cell of the UE; and
when the channel quality indicator having the largest value among the extracted channel quality indicators is determined to be the channel quality indicator of the serving sub-cell of the UE, maintaining the serving sub-cell.

2. The method of claim 1, further comprising, when the channel quality indicator having the largest value among the extracted channel quality indicators is determined not to be the channel quality indicator of the serving sub-cell of the UE, performing sub-cell switching of the UE to a sub-cell having the channel quality indicator having the largest value.

3. The method of claim 1, wherein the sub-cell uses a physical cell identifier identical to the physical cell identifier of other sub-cells included in the macro coverage.

4. The method of claim 3, further comprising:
generating a demodulation reference signal sequence;
applying a scrambling identifier to the generated demodulation reference signal sequence;
mapping a demodulation reference signal, to which the scrambling identifier has been applied, to a predetermined resource; and
transmitting the mapped demodulation reference signal to the UE.

5. The method of claim 3, further comprising:
determining whether a time point corresponds to a first timing for transmission of a channel state information reference signal; and
when the time point corresponds to the first timing, transmitting the channel state information reference signal at a predetermined resource position.

6. The method of claim 5, further comprising:
determining whether the time point corresponds to a second timing for transmission of a channel state information reference signal; and
when the time point corresponds to the second timing, applying a random noise or a muted channel state information reference signal to a resource position corresponding to a resource position at which a neighbor sub-cell of the sub-cell transmits a channel state information reference signal.

7. The method of claim 1, further comprising:
generating a demodulation reference signal to which a Virtual Cell IDentifier (VCID) specific to the sub-cell has been applied;
mapping the generated demodulation reference signal to a predetermined resource; and
transmitting the mapped demodulation reference signal to the UE.

8. The method of claim 1, further comprising:
determining a Coordinated Multi-Point transmission and reception (CoMP) measurement set including a serving sub-cell and a neighbor sub-set of the UE;
transmitting configuration information on channel measurement information reference signal resources for channel measurement of sub-cells included in the CoMP measurement set to the UE;
generating a channel state information reference signal to which a Virtual Cell IDentifier (VCID) specific to the sub-cell has been applied; and
transmitting the generated channel state information reference signal to the UE based on the configuration information.

9. The method of claim 8, further comprising:
transmitting configuration information on zero power channel measurement information reference signal resources for the sub-cells included in the CoMP measurement set to the UE;
mapping a zero power channel measurement information reference signal to a data region of a resource transmitted to the UE according to the configuration information; and
transmitting the mapped zero power channel measurement information reference signal to the UE,
wherein the UE measures interference through the zero power channel measurement information reference signal.

10. The method of claim 1, wherein the sub-cell shares the feedback information with at least one of a neighbor sub-cell and a central scheduler.

11. The method of claim 1, wherein the sub-cell comprises at least one of a Remote Radio Head (RRH), a Transmission Point (TP), and a small cell.

12. The method of claim 1, wherein the receiving of the multiple pieces of feedback information comprises, when the UE can perform only a single channel state information process, alternately receiving the multiple pieces of feedback information on the multiple sub-cells from the UE.

13. A sub-cell supporting fast sub-cell switching in a wireless communication system, the sub-cell comprising:
a wired/wireless interface configured to perform a wired/wireless communication with at least one of a User Equipment (UE) and a higher node; and
a controller configured to:
receive multiple pieces of feedback information on multiple sub-cells from the UE,
extract channel quality indicators from the multiple pieces of received feedback information, respectively,
compare values of the extracted channel quality indicators, and
determine, based on a result of the comparison of the values of the extracted channel quality indicators, whether to perform fast sub-cell switching of the UE,
wherein the controller is further configured to:
determine whether a channel quality indicator having a largest value among the extracted channel quality indicators is a channel quality indicator of a serving sub-cell of the UE, and
maintain the serving sub-cell when the channel quality indicator having the largest value among the extracted channel quality indicators is determined to be the channel quality indicator of the serving sub-cell of the UE.

14. The sub-cell of claim 13, wherein, when the channel quality indicator having the largest value among the extracted channel quality indicators is determined not to be the channel quality indicator of the serving sub-cell of the UE, the controller controls to perform sub-cell switching of the UE to a sub-cell having the channel quality indicator having the largest value.

15. The sub-cell of claim 13, wherein the sub-cell uses a physical cell identifier identical to the physical cell identifier of other sub-cells included in a macro coverage.

16. The sub-cell of claim 15, wherein the controller is further configured to perform a control to generate a demodulation reference signal sequence, to apply a scrambling identifier to the generated demodulation reference signal sequence, to map a demodulation reference signal, to which the scrambling identifier has been applied, to a predetermined resource, and to transmit the mapped demodulation reference signal to the UE.

17. The sub-cell of claim 15, wherein the controller is further configured to perform a control to determine whether the time point corresponds to a first timing for transmission of a channel state information reference signal, and to transmit the channel state information reference signal at a predetermined resource position when the time point corresponds to the first timing.

18. The sub-cell of claim 17, wherein the controller is further configured to perform a control to determine whether the time point corresponds to a second timing for transmission of a channel state information reference signal, and when the time point corresponds to the second timing, to apply a random noise or a muted channel state information reference signal to a resource position corresponding to a resource position at which a neighbor sub-cell of the sub-cell transmits a channel state information reference signal.

19. The sub-cell of claim 13, wherein the controller is further configured to generate a demodulation reference signal to which a Virtual Cell IDentifier (VCID) specific to the sub-cell has been applied, to map the generated demodulation reference signal to a predetermined resource, and to transmit the mapped demodulation reference signal to the UE.

20. The sub-cell of claim 13, wherein the controller is further configured to determine a Coordinated Multi-Point transmission and reception (CoMP) measurement set including a serving sub-cell and a neighbor sub-set of the UE, to transmit configuration information on channel measurement information reference signal resources for channel measurement of sub-cells included in the CoMP measurement set to the UE, to generate a channel state information reference signal to which a Virtual Cell IDentifier (VCID) specific to the sub-cell has been applied, and to transmit the generated channel state information reference signal to the UE based on the configuration information.

21. The sub-cell of claim 20, wherein the controller is further configured to transmit configuration information on zero power channel measurement information reference signal resources for the sub-cells included in the CoMP measurement set to the UE, to map a zero power channel measurement information reference signal to a data region of a resource transmitted to the UE according to the configuration information, and to transmit the mapped zero power channel measurement information reference signal to the UE, so that the UE measures interference through the zero power channel measurement information reference signal.

22. The sub-cell of claim 13, wherein the controller is configured to share the feedback information with at least one of a neighbor sub-cell and a central scheduler.

23. The sub-cell of claim 13, wherein the sub-cell comprises at least one of a Remote Radio Head (RRH), a Transmission Point (TP), and a small cell.

24. The sub-cell of claim 13, wherein, when the UE can perform only a single channel state information process, the controller performs a control to alternately receive the multiple pieces of feedback information on the multiple sub-cells from the UE.

25. The method of claim 1, wherein the macro coverage comprises a plurality of sub-cells, and
wherein the plurality of sub-cells are discriminated from each other by combinations of a Physical Cell IDentifier (PCID) and Virtual Cell IDentifiers (VCIDs).

26. A non-transitory computer-readable storage medium storing instructions that, when executed, cause at least one processor to perform the method of claim 1.

* * * * *